US012786213B1

(12) United States Patent
Arifi et al.

(10) Patent No.: US 12,786,213 B1
(45) Date of Patent: Nov. 3, 2026

(54) DETECTING MALICIOUS INPUTS INTO ARTIFICIAL INTELLIGENCE AGENTS

(71) Applicant: Citibank, N.A., New York, NY (US)

(72) Inventors: Imir Arifi, Chicago, IL (US); Ganesh Prasad Bhat, West Orange, NJ (US); James Myers, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/356,755

(22) Filed: Oct. 13, 2025

(51) Int. Cl.
*H04L 9/00* (2022.01)
*H04L 9/40* (2022.01)

(52) U.S. Cl.
CPC ...... *H04L 63/1416* (2013.01); *H04L 63/1441* (2013.01)

(58) Field of Classification Search
CPC ........................ H04L 63/1441; H04L 63/1416
USPC ........................................................... 726/23
See application file for complete search history.

(56) References Cited

U.S. PATENT DOCUMENTS

2013/0282438 A1* 10/2013 Hunter ............... G06Q 30/0201 705/7.32
2021/0390455 A1* 12/2021 Schierz .................. G06N 20/00
2023/0153340 A1* 5/2023 K ........................... G06N 3/045 704/9
2023/0368284 A1* 11/2023 Sheikh .................. H04L 9/0618
2024/0007366 A1* 1/2024 Mermoud ............... H04L 41/16
2024/0320476 A1* 9/2024 Chandrasekaran .... G06N 20/00
2025/0068741 A1* 2/2025 Lafon .................. G06F 21/554
2025/0211611 A1* 6/2025 Douglas .............. H04L 63/1416
2026/0156125 A1* 6/2026 Westenberger .... G06Q 30/0185

OTHER PUBLICATIONS

Llama Guard: LLM-based Input-Output Safeguard for Human-AI Conversations B Y Hakan Inan ET.al, arXiv:2312.06674v1 [cs.CL] Dec. 7, 2023, GenAI at Meta.*

* cited by examiner

*Primary Examiner* — Josnel Jeudy

(57) ABSTRACT

Methods and systems for detecting malicious inputs into artificial intelligence agents are disclosed herein. A communication session between an artificial intelligence agent and a client device may be monitored. The communication session may include multiple requests from the client device and multiple responses from the artificial intelligence agent. A topic detection machine learning model may be used to determine response metrics for each response. Each response metric may indicate proximity of a corresponding response to a prohibited topic. The system may determine whether response metrics meet or exceed a threshold proximity to a prohibited topic. Based on determining that response metrics meet the threshold proximity, a response indicating that the prohibited topic has been detected may be generated and transmitted to the client device.

20 Claims, 9 Drawing Sheets

| Request ID (203) | Request (206) | Response (209) | TimeStamp (212) | Communication Parameters (215) |
|---|---|---|---|---|
| 6Z86B273 | Request_Data | Response_Data | 2025-09-04-13:20 | <Params_1> |
| 6Z86B274 | Request_Data | Response_Data | 2025-09-04-13:22 | <Params_2> |
| 6Z86B275 | Request_Data | Response_Data | 2025-09-04-13:24 | <Params_3> |
| 6Z86B276 | Request_Data | Response_Data | 2025-09-04-13:26 | <Params_4> |
| 6Z86B285 | Request_Data | Response_Data | 2025-09-04-13:28 | <Params_5> |
| 6Z86B286 | Request_Data | Response_Data | 2025-09-04-13:30 | <Params_6> |
| 6Z86B296 | Request_Data | Response_Data | 2025-09-04-13:32 | <Params_7> |
| 6Z86B297 | Request_Data | Response_Data | 2025-09-04-13:34 | <Params_8> |

*FIG. 2*

| Request ID (303) | Proximity Topic_1 (306) | Proximity Topic_2 (309) | Proximity Topic_3 (312) | Proximity Topic_4 (315) |
|---|---|---|---|---|
| 6Z86B273 | 10 | 10 | 0 | 20 |
| 6Z86B274 | 10 | 10 | 0 | 25 |
| 6Z86B275 | 10 | 10 | 0 | 30 |
| 6Z86B276 | 10 | 10 | 0 | 35 |
| 6Z86B285 | 10 | 10 | 0 | 40 |
| 6Z86B286 | 10 | 10 | 0 | 45 |
| 6Z86B296 | 10 | 10 | 0 | 50 |
| 6Z86B297 | 10 | 10 | 0 | 55 |

*FIG. 3*

| Attack Profile ID (403) | Concealment (406) | Cadence Data (409) | Param_1 (412) |
|---|---|---|---|
| AP6Z86B273 | True | <Data_1> | <Data> |
| AP6Z86B274 | True | <Data_2> | <Data> |
| AP6Z86B275 | True | <Data_3> | <Data> |
| AP6Z86B276 | True | <Data_4> | <Data> |

*FIG. 4*

| Profile ID (503) | Cadence (506) | Location (509) | Param_1 (512) |
|---|---|---|---|
| USER_6Z86B273 | <Data> | Location_1 | <Data> |
| USER_6Z86B274 | <Data> | Location_2 | <Data> |
| USER_6Z86B275 | <Data> | Location_3 | <Data> |
| USER_6Z86B276 | <Data> | Location_4 | <Data> |

*FIG. 5*

DETECTING MALICIOUS INPUTS INTO ARTIFICIAL INTELLIGENCE AGENTS

BACKGROUND

Artificial intelligence systems, particularly large language models (LLMs) and agentic artificial intelligence (AI) systems, have become increasingly prevalent in various applications ranging from customer service to content generation. These systems process natural language inputs, commonly referred to as prompts, to generate contextually appropriate responses. As these AI systems become more sophisticated and widely deployed, they face growing security challenges related to malicious prompt manipulation. Existing governance mechanisms typically employ rule-based approaches that examine prompts and outputs for immediate policy violations. However, these approaches may fail to detect more sophisticated attacks.

SUMMARY

As mentioned above, current AI systems are vulnerable to various forms of prompt-based attacks where adversaries attempt to manipulate the system's behavior through carefully crafted inputs. These attacks can range from simple attempts to bypass content filters to more sophisticated techniques that gradually steer conversations toward prohibited or harmful topics. Traditional security measures often focus on analyzing individual prompts in isolation as those prompt match various rules, which may, in some cases, be insufficient to detect complex or multi-step manipulation strategies.

The challenge is compounded by the mathematical nature of how these systems interpret prompts. AI models convert textual inputs into numerical representations and use similarity measures to match prompts against their knowledge bases. This process can be exploited through various techniques, including contextual manipulation and gradual drift attacks, where seemingly innocuous prompts cumulatively lead to undesired outcomes. Additionally, the temperature settings and other parameters that control the creativity and determinism of AI responses can introduce vulnerabilities that attackers may exploit.

Accordingly, systems and methods are disclosed herein for detecting malicious inputs into artificial intelligence agents. The operations discussed herein may be performed by a attack detection system. The attack detection system may monitor requests (e.g., prompts) and/or responses (e.g., action of the artificial intelligence agent) to identify attacks. In some implementations, the attack detection system may monitor a communication session between an artificial intelligence agent and a client device. The communication session may include multiple requests from the client device and multiple responses from the artificial intelligence agent. The artificial intelligence agent may be associated with a corresponding computer-executable operation set configured to be autonomously executed by the artificial intelligence agent on a software application set.

In some implementations, the attack detection system may analyze responses (e.g., to prompts) as they are generated by an artificial intelligence agent. The attack detection system may determine, for each response using a topic detection machine learning model, a corresponding set of response metrics. Each response metric may indicate how close a corresponding response is to a prohibited topic. The topic detection machine learning model may be one that has been trained to detect prohibited topics in model inputs. The system may determine whether one or more response metrics within one or more sets of response metrics meets a threshold proximity to a prohibited topic. The threshold proximity may indicate that a response metric is within a zone of proximity of the prohibited topic that requires intervention. Based on determining that the one or more response metrics meets the threshold proximity, the attack detection system may generate a response that indicates that the prohibited topic has been detected. The attack detection system may then transmit the response to the client device.

In some implementations, the attack detection system may analyze requests (e.g., prompts) as they are sent to the artificial intelligence agent. The attack detection system may analyze each user request using a specialized machine learning model to measure how close each request comes to forbidden topics. The system may track how conversations gradually drift toward prohibited subjects over time by calculating a drift metric. When the drift reaches a concerning level, the system may gather additional information about the communication session. The system may use this session information along with the drift measurement to determine if the conversation represents a malicious attack. If the system identifies the conversation as malicious, it may immediately end the communication session.

According to an aspect of the present disclosure, the attack detection system may detect malicious inputs into artificial intelligence agents based on agent responses (e.g., outputs). The attack detection system may monitor ongoing conversations between AI systems and users to identify potential security threats. For example, the attack detection system may track communication sessions to identify patterns of malicious behavior based on generated output. The communication session may be between an artificial intelligence agent and a client device. For example, the system may continuously observe the exchange of messages between a chatbot and a user's smartphone or computer throughout their entire conversation.

The attack detection system may analyze conversations that contain multiple back-and-forth exchanges between users and AI systems (e.g., an AI agent). The communication session may include a plurality of requests from the client device and a plurality of responses from the artificial intelligence agent. For example, a conversation might include dozens of user questions and AI responses spanning several minutes or hours of interaction.

The attack detection system may use AI agents that has been trained to perform automated tasks. Each artificial intelligence agent may be associated with a corresponding computer-executable operation set configured to be autonomously executed by the artificial intelligence agent on a software application set. For example, the AI agent might be programmed to automatically send emails, update databases, reserve airline tickets, or control smart home devices based on user requests.

The attack detection system may evaluate AI responses to determine if they contain harmful or prohibited content. The instructions may cause one or more processors to determine, for each response of the plurality of responses using a topic detection machine learning model, a corresponding set of response metrics. For example, the system might analyze each AI response using a neural network trained to identify discussions about violence, illegal activities, or other forbidden topics.

The attack detection system may measure how closely AI responses relate to topics that should be avoided. Each response metric in each corresponding set of response metrics may indicate a proximity of a corresponding response to a corresponding prohibited topic. For example, a response metric might show that an AI's answer about chemistry is 85% similar to discussions about dangerous explosives.

The attack detection system may use specialized AI models that have been trained to recognize dangerous content. The topic detection machine learning model may have been trained to detect prohibited topics in model inputs. For example, the model might have been trained on millions of examples of harmful content to learn the patterns and language associated with prohibited discussions.

The attack detection system may identify when AI responses become dangerously close to forbidden topics. In particular, the attack detection system may determine whether one or more response metrics within one or more sets of response metrics meets a threshold proximity to a prohibited topic. For example, the system might flag any response that scores above 75% similarity to discussions about how to access private information.

The attack detection system may define specific boundaries that trigger security interventions. Thus, in some implementations, the threshold proximity may indicate that a response metric is within a zone of proximity of the prohibited topic that requires intervention. For example, any response that comes within 80% similarity to discussions about self-harm might automatically trigger protective measures.

The attack detection system may create warning messages when dangerous content is detected. The instructions may cause one or more processors to, based on determining that the one or more response metrics within the one or more sets of response metrics meets the threshold proximity, generate a response that indicates that the prohibited topic has been detected. For example, the system might generate a message stating "This conversation has been flagged for containing potentially harmful content."

The attack detection system may deliver security alerts directly to users and/or operators when threats are identified. The attack detection system may transmit the response to the client device or to another suitable device. For example, the system might send a warning notification to the user's smartphone or display an alert message in their web browser. In some implementations, the message may be sent to another system that may end or otherwise reset the communication session.

According to some aspects of the present disclosure, the attack detection system may use request (prompts) within a session to detect attacks. That is, the attack detection system may analyze user requests to detect gradual manipulation attempts. to perform this type of detection, the attack detection system may determine, for a plurality of requests using a proximity detection machine learning model, a plurality of sets of request metrics. Each request metric in each set of request metrics may indicate the proximity of a corresponding request to one or more prohibited topics. The proximity detection machine learning model may have been trained to detect request proximity to the prohibited topics in the model inputs. The attack detection system may track how conversations slowly drift toward dangerous topics over time.

The attack detection system may then determine, based on each corresponding set of request metrics for the communication session, a drift metric indicating a request drift toward the one or more prohibited topics. The attack detection system may identify when conversations reach concerning levels of drift toward prohibited content. The attack detection system may further, based on determining that the drift metric meets a drift threshold, determine a plurality of communication session parameters. The attack detection system may evaluate multiple factors to determine if a conversation represents a coordinated attack. The attack detection system may further determine, based on the plurality of communication session parameters and the drift metric, that the communication session is malicious. The attack detection system may immediately terminate dangerous conversations to prevent harm. Thus, the attack detection system may, based on determining that the communication session is malicious, end the communication session.

The attack detection system may use various parameters to help identify attacks. For example, the attack detection system may detect when users are attempting to hide their identity or location. In particular, the attack detection system may determine a concealment parameter that indicates whether the client device is using a virtual private network server for transmitting requests or is otherwise hiding its location. The concealment parameter may indicate concealment when use of the virtual private network server is detected.

The attack detection system may analyze the timing patterns of user requests to identify suspicious behavior. For example, the attack detection system may determine a request cadence associated with the communication session. The request cadence may indicate a frequency of requests in relation to previous responses. For example, if the requests are coming in very quickly after responses, the attack detection system may determine that the requests are being automatically generated (e.g., by an AI system). In some implementations, the attack detection system may combine multiple suspicious indicators into a comprehensive threat assessment by adding the concealment parameter and the request cadence to the plurality of communication session parameters. Other parameters may be added to the communication session parameters.

The attack detection system may create detailed profiles of attack patterns for future reference. In particular, the attack detection system may generate, based on the plurality of communication session parameters, an attack profile. The attack profile may include the concealment parameter, an indication of the request cadence and/or other parameters.

The attack detection system may then compare current threats against known attack methods. In particular, the attack detection system may compare the attack profile to known attack profiles to determine whether the attack profile matches previous attack profiles. The attack detection system may take immediate action when recognizing familiar attack patterns. For example, based on determining that the attack profile matches a previous attack profile, the attack detection system may end the communication session and store the attack profile in a database.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 2 illustrates an excerpt of a data structure that stores the communication session, in accordance with one or more embodiments of this disclosure.

FIG. 3 illustrates an excerpt of a data structure for storing proximity topic data for different prohibited topics, in accordance with one or more embodiments of this disclosure.

FIG. 4 illustrates an excerpt of a data structure storing attack profiles, in accordance with one or more embodiments of this disclosure.

FIG. 5 illustrates an excerpt of a data structure for storing demographic profiles, in accordance with one or more embodiments of this disclosure.

DETAILED DESCRIPTION

Figure 1:
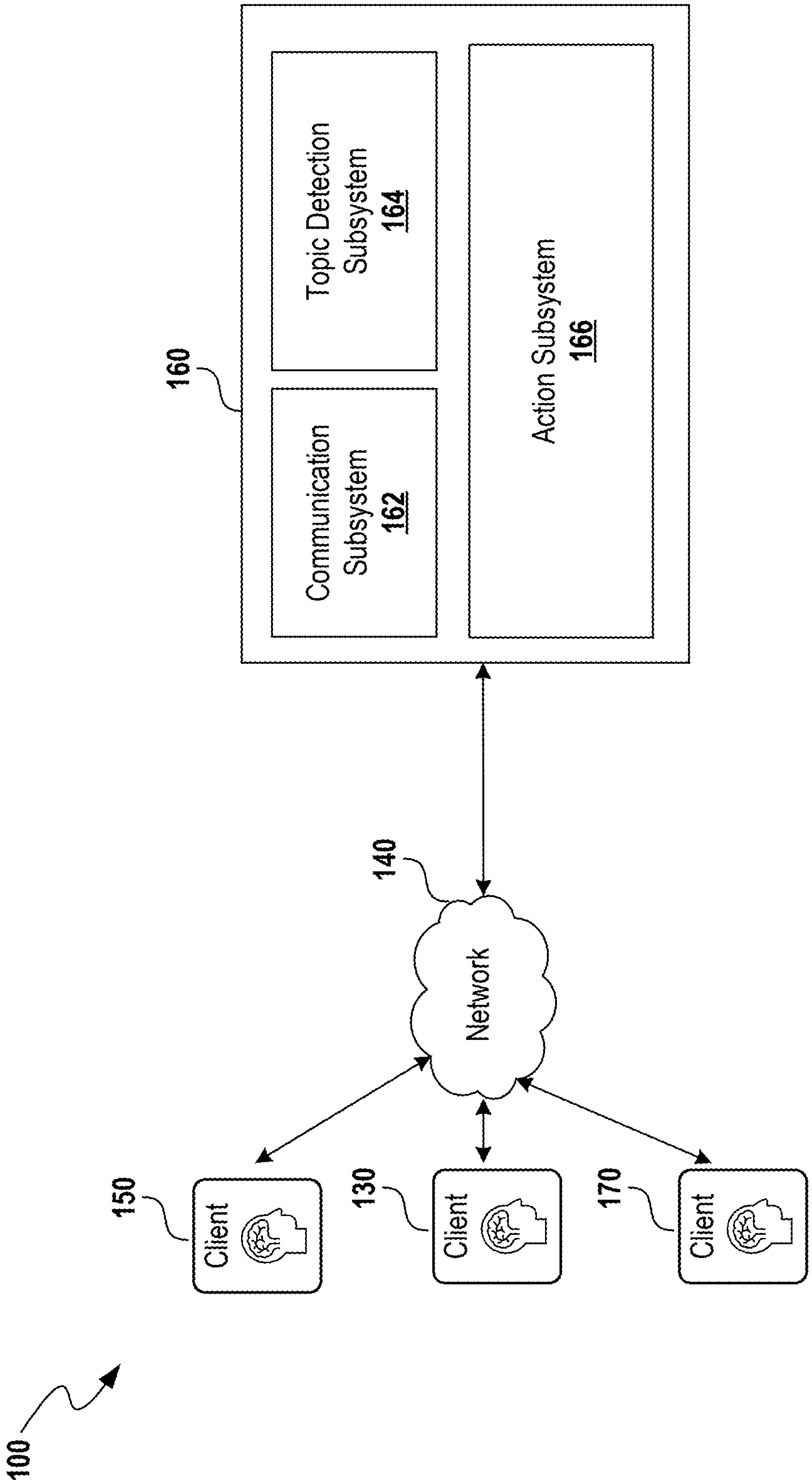
FIG. 1 shows an illustrative system for detecting malicious inputs into artificial intelligence agents, in accordance with one or more embodiments of this disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein. Furthermore, in the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement.

Artificial intelligence agents have become increasingly prevalent in various applications, from customer service chatbots to sophisticated language models that can perform complex reasoning tasks. These AI agents may process user inputs in the form of prompts or requests and generate corresponding responses based on their training and programmed parameters. However, the growing sophistication of AI agents has also introduced new security vulnerabilities that malicious actors may exploit to manipulate these systems into producing harmful, inappropriate, or prohibited content.

Malicious inputs into artificial intelligence agents may take various forms, ranging from direct attempts to bypass content filters to more subtle manipulation techniques that gradually steer conversations toward prohibited topics. These attacks may exploit the mathematical processes underlying AI agent operations, such as vector similarity calculations and contextual awareness mechanisms, to misalign user intent with the AI agent's internal controls. In some cases, attackers may employ sophisticated strategies that involve building trust with the AI agent over multiple interactions before attempting to elicit prohibited responses.

Traditional security measures for AI agents may focus primarily on analyzing individual prompts or requests in isolation, which may prove insufficient against advanced attack techniques. Some malicious actors may employ "crescendo attacks" or "drift attacks" where they use a series of seemingly innocuous requests to gradually move a conversation toward prohibited territory without triggering immediate security alerts. These attacks may exploit the AI agent's contextual memory and the cumulative effect of multiple interactions to achieve their malicious objectives.

The detection of malicious inputs into artificial intelligence agents may involve analyzing not only the content of individual requests and responses but also the patterns and trajectories of entire communication sessions. This analysis may include monitoring for gradual drift toward prohibited topics, identifying suspicious user behavior patterns, and assessing various communication parameters that may indicate malicious intent. Such comprehensive monitoring may enable the identification of both immediate threats and long-term manipulation attempts that might otherwise go undetected.

Furthermore, the assessment of cyber threats against AI agents may extend beyond content analysis to include user profiling and behavioral analysis. Factors such as communication cadence, linguistic patterns, geographical location, and technical characteristics of the client device may provide additional indicators of potentially malicious activity. By combining content-based detection with behavioral analysis, security systems may achieve more robust protection against the evolving landscape of AI-targeted cyber threats.

Referring to FIG. 1, environment 100 is an example of a comprehensive framework for detecting malicious inputs into artificial intelligence agents through systematic monitoring and analysis of communication patterns. Environment 100 may include multiple client devices (e.g., client device 130, 150, and 170) that may communicate with a device hosting attack detection system 160 through a network 140. Attack detection system 160 may monitor communication sessions between artificial intelligence agents and the client devices (e.g., client device 130, 150, or 170) to identify potential security threats and malicious manipulation attempts. Each communication session may include a plurality of requests from a client device and a plurality of responses from an artificial intelligence agent.

In some implementations, The artificial intelligence agent may be associated with a corresponding computer-executable operation set configured to be autonomously executed by the artificial intelligence agent on a software application set. For example, the attack detection system 160 may establish secure communication channels with each client device, log all incoming requests and outgoing responses, and maintain session state information to track conversation flow and context over time. Each artificial intelligence agent may perform their tasks by processing natural language inputs through sophisticated neural network architectures, such as transformers or large language models, to understand user intent and generate contextually appropriate responses. These agents may operate by converting textual prompts into numerical representations, applying learned parameters and weights to analyze the semantic meaning, and then generating outputs that align with their training objectives and operational constraints. The AI agents may execute their computer-executable operation sets by interfacing with various software applications through application programming interfaces (APIs), database connections, or direct system calls to perform actions such as data retrieval, content generation, or automated decision-making. In some implementations, the AI agents may continuously adapt their behavior based on ongoing interactions, utilizing reinforcement learning mechanisms or fine-tuning processes to improve their performance and maintain alignment with user expectations and safety protocols.

Attack detection system 160 may include specialized subsystems designed to handle different aspects of threat detection and response coordination. A communication subsystem 162 may manage the flow of data between the client devices (e.g., client devices 130, 150, and 170) and other components of attack detection system 160. Communication subsystem 162 may handle protocol translation, message routing, and session management to ensure reliable communication across network 140. A topic detection subsystem 164 may analyze the content and patterns within communication sessions to identify potential threats and prohibited topics. An action subsystem 166 may coordinate response actions when threats are detected, including session termination, alert generation, and data logging for further analysis. For example, communication subsystem 162 may implement secure socket layer protocols for encrypted data transmission, maintain connection pools for efficient resource utilization, and provide load balancing capabilities to distribute processing across multiple server instances.

In some implementations, attack detection system 160 may employ a dual-agent architecture that may provide comprehensive coverage against both immediate and long-term security threats. A short-term governance agent may monitor individual requests and responses for immediate policy violations, such as direct attempts to access prohibited content or bypass security controls. The short-term governance agent may analyze each communication in isolation using rule-based detection methods and predefined content filters. In some implementations, the short-term governance agent may use context-based detection methods as outlined below.

A long-term memory agent may detect gradual drift over conversation history by maintaining extended memory of user interactions and analyzing patterns across multiple communication sessions. The long-term memory agent may identify subtle manipulation techniques where attackers gradually steer conversations toward prohibited topics without triggering immediate security alerts. For example, the short-term governance agent may scan each incoming request for prohibited keywords, malicious code patterns, and policy violations using regular expression matching and content classification algorithms, while the long-term memory agent may maintain conversation state vectors and apply machine learning models to detect anomalous conversation trajectories over extended time periods. In some implementations the long-term memory agent may perform operations on requests (prompts), responses, and/or a combination of both.

With continued reference to FIG. 1, network 140 may facilitate secure and reliable communication between the client devices and attack detection system 160. Network 140 may include various networking infrastructure components such as routers, switches, firewalls, and load balancers that may ensure proper data routing and security enforcement. Network 140 may support multiple communication protocols and may provide redundancy and fault tolerance to maintain system availability. Client devices 130, 150, and 170 may represent different types of computing devices that may interact with artificial intelligence agents, including desktop computers, mobile devices, tablets, and embedded systems. Each client device may maintain its own communication parameters and session state information that may be analyzed by attack detection system 160 for threat assessment purposes. For example, network 140 may implement virtual private network tunneling for secure data transmission, quality of service policies to prioritize critical communications, and intrusion detection systems to monitor for network-level security threats. In some implementations, client devices may be other AI agents or automated systems using an artificial intelligence agent for a particular purpose.

Topic detection subsystem 164 may implement sophisticated response monitoring capabilities that may analyze outputs from artificial intelligence agents to identify potential proximity to prohibited topics. Although topic detection is discussed in relation to response (e.g., AI agent outputs), topic detection subsystem 164 may also apply topic detection to each request (e.g., input into the AI agent). Topic detection subsystem 164 may employ a topic detection machine learning model that may process each response (or request) generated by an artificial intelligence agent to calculate corresponding response metrics (or request metrics). The topic detection machine learning model may have been trained to detect prohibited topics in model inputs using supervised learning techniques with labeled datasets containing examples of prohibited and/or acceptable content. For example, the topic detection machine learning model may utilize transformer-based neural network architectures that may tokenize response text into numerical vectors, apply attention mechanisms to identify semantic relationships, and generate probability distributions indicating the likelihood that specific content relates to prohibited topics.

Referring to FIG. 3, topic detection subsystem 164 may, in some implementations, generate and maintain detailed proximity measurements for each communication session through systematic analysis of response content (or request content). A request identifier 303 may uniquely identify each request-response pair within a communication session, enabling topic detection subsystem 164 to track proximity measurements across multiple interactions. Topic detection subsystem 164 may calculate multiple proximity metrics for each response (or request), including a first proximity topic 306, a second proximity topic 309, a third proximity topic 312, and a fourth proximity topic 315, where each proximity metric may correspond to different categories of prohibited content or different analytical approaches. Each response metric (or request metric) in each corresponding set of response metrics (or request metrics) may indicate a proximity of a corresponding response (or request) to a corresponding prohibited topic, providing quantitative measurements that may enable automated decision-making regarding content acceptability. For example, first proximity topic 306 may measure proximity to violent content using semantic similarity calculations, second proximity topic 309 may assess proximity to financial fraud topics through keyword density analysis, third proximity topic 312 may evaluate proximity to personal information disclosure through named entity recognition, and fourth proximity topic 315 may determine proximity to hate speech through sentiment analysis and linguistic pattern matching.

Topic detection subsystem 164 may employ dynamic and elastic definitions of drift that may adapt to new attack vectors and proximity to prohibited topics through continuous learning mechanisms. Topic detection subsystem 164 may update prohibited topic boundaries based on emerging threat patterns, regulatory changes, and feedback from security analysts to maintain effectiveness against evolving attack strategies. The dynamic definitions may allow topic detection subsystem 164 to recognize novel forms of prohibited content that may not have been present in original training datasets, while elastic boundaries may provide flexibility in determining when content approaches unacceptable proximity levels. For example, topic detection subsystem 164 may implement reinforcement learning algorithms that may adjust proximity thresholds based on false positive rates, incorporate external threat intelligence feeds to identify new prohibited topic categories, and utilize ensemble methods that may combine multiple detection models to improve accuracy and reduce bias in proximity calculations.

With continued reference to FIG. 3, topic detection subsystem 164 may utilize cosine similarity calculations to compare tokenized prompt vectors against knowledge base vectors for intent interpretation and proximity assessment. Topic detection subsystem 164 may convert textual responses into high-dimensional vector representations using embedding techniques, then may calculate cosine similarity scores between response vectors and reference vectors representing prohibited topics stored in a knowledge base. The cosine similarity calculations may provide normalized similarity measures that may range from zero to one, where higher values may indicate greater proximity to prohibited content categories. For example, topic detection subsystem 164 may generate multi-dimensional embedding vectors for each response using pre-trained language models, maintain a knowledge base containing thousands of reference vectors for different prohibited topic categories, and apply cosine similarity formulas to compute dot products between normalized vectors, resulting in proximity scores that may be stored as first proximity topic 306, second proximity topic 309, third proximity topic 312, and fourth proximity topic 315 for comprehensive threat assessment.

Attack detection system 160 may implement sophisticated threshold detection mechanisms that may evaluate response metrics (or request metrics) against predetermined proximity boundaries to identify when artificial intelligence agent outputs approach prohibited content areas. The threshold proximity determination process may involve comparing calculated proximity values to established threshold levels that may define zones of intervention around prohibited topics. The threshold proximity may indicate that a response metric (or a request metric) may be within a zone of proximity of the prohibited topic that may require intervention, establishing clear boundaries for automated security responses. For example, attack detection system 160 may establish multiple threshold levels for different prohibited topic categories, where proximity values above 0.7 may trigger immediate intervention, values between 0.5 and 0.7 may generate warning alerts, and values below 0.5 may be considered acceptable, with these thresholds being dynamically adjusted based on historical attack patterns and false positive rates.

Attack detection system 160 may determine whether one or more response metrics (or request metrics) within one or more sets of response metrics (or request metrics) meets (or exceeds) a threshold proximity to a prohibited topic through systematic evaluation of proximity measurements across multiple analytical dimensions. In some implementations, the determination process may involve aggregating proximity scores from different detection models, applying weighted scoring algorithms that may account for the severity of different prohibited topic categories, and implementing temporal analysis that may consider proximity trends across multiple communication exchanges.

In some implementations, attack detection system 160 may utilize ensemble decision-making approaches that may combine results from multiple machine learning models to reduce false positives and improve detection accuracy. For example, attack detection system 160 may calculate composite proximity scores by applying weighted averages to individual proximity metrics, where violent content proximity may receive a weight of 0.4, fraud-related content proximity may receive a weight of 0.3, and privacy violation proximity may receive a weight of 0.3, with the final composite score being compared against a threshold value of 0.6 to determine intervention necessity.

The zone of proximity concept may establish graduated response levels that may provide proportional security measures based on the degree of proximity to prohibited topics rather than implementing binary allow-or-deny decisions. Attack detection system 160 may define multiple concentric zones around prohibited topic boundaries, where each zone may trigger different response protocols ranging from passive monitoring to active intervention. The zone-based approach may enable attack detection system 160 to detect crescendo attacks where users may approach prohibited topics, back away, and return from different angles to bypass controls through systematic boundary testing. For example, attack detection system 160 may implement a three-zone proximity model where the outer zone (proximity 0.3-0.5) may trigger enhanced monitoring and logging, the middle zone (proximity 0.5-0.7) may generate security alerts and apply additional content filtering, and the inner zone (proximity above 0.7) may immediately terminate communication sessions and block further access attempts.

Attack detection system 160 may generate response notifications when prohibited topic detection occurs through automated response generation mechanisms that may create contextually appropriate security messages based on the specific nature of detected threats. The response generation process may involve analyzing the type of prohibited content detected, the severity level of the proximity violation, and the communication context to formulate appropriate warning messages or intervention notifications. Attack detection system 160 may customize response content to provide clear explanations of policy violations while avoiding disclosure of specific detection mechanisms that could be exploited by malicious actors. For example, attack detection system 160 may generate standardized response templates that may include violation category identifiers, timestamp information, and session termination notices, where responses for violent content detection may state "Communication terminated due to policy violation-Category V-001", while responses for fraud-related content may state "Session ended due to security concerns—Category F-002", with each response being logged for audit purposes and regulatory compliance.

Attack detection system 160 may transmit the response to the client device through secure communication channels that may ensure reliable delivery of security notifications while maintaining system integrity and preventing information leakage. The response transmission process may involve encrypting response messages using established security protocols, applying digital signatures to verify message authenticity, and implementing delivery confirmation mechanisms to ensure client devices receive security notifications. Attack detection system 160 may utilize multiple communication pathways to ensure response delivery even when primary communication channels may be compromised or unavailable. For example, attack detection system 160 may transmit responses using HTTPS protocols with TLS 1.3 encryption, include message authentication codes to prevent tampering, and implement retry mechanisms that may attempt response delivery through alternative network paths if initial transmission attempts fail, while maintaining detailed logs of all response transmission activities for security audit and compliance monitoring purposes.

Attack detection system 160 may implement comprehensive request analysis capabilities that may enable detection of malicious manipulation attempts through systematic examination of communication patterns and drift behaviors over extended time periods. This may be implemented on AI agent requests (e.g., prompts), AI agent responses, or on both. Attack detection system 160 may analyze incoming requests from client devices (or responses from AI agents) to identify gradual shifts in conversation direction that may indicate crescendo attacks or other sophisticated manipulation strategies. The attack detection system 160 may employ a proximity detection machine learning model that may process each request to generate quantitative measurements of proximity to prohibited topics, enabling detection of subtle approaches toward restricted content areas. For example, attack detection system 160 may utilize natural language processing algorithms to tokenize request text, apply semantic analysis to identify topic relationships, and calculate proximity scores using vector similarity computations between request embeddings and prohibited topic reference vectors stored in a knowledge database.

Referring to FIG. 2, attack detection system 160 may maintain detailed communication session records that may provide comprehensive tracking of request-response interactions across multiple communication exchanges. A request identifier 203 may uniquely identify each communication exchange within a session, enabling attack detection system 160 to maintain chronological ordering and establish relationships between sequential requests and responses. Request data 206 may contain the actual content of user inputs, including textual prompts, commands, and any associated metadata that may be relevant for threat analysis. Response data 209 may store the corresponding outputs generated by artificial intelligence agents, providing complete records of communication exchanges for pattern analysis and drift detection. A timestamp 212 may record the precise timing of each communication exchange, enabling attack detection system 160 to analyze temporal patterns and identify suspicious timing behaviors that may indicate automated attacks or coordinated manipulation attempts. Communication parameters 215 may capture additional contextual information about each communication exchange, including technical characteristics, user behavior indicators, and environmental factors that may contribute to threat assessment calculations.

Attack detection system 160 may determine, for the plurality of requests (or responses) using the proximity detection machine learning model, a plurality of sets of request metrics (or response metrics) that may quantify the relationship between each request (or each response) and various categories of prohibited content. Each request metric (or response metric) in each set of request metrics (or response metrics) may indicate the proximity of a corresponding request (or response) to one or more prohibited topics, providing numerical values that may enable automated analysis of content appropriateness and threat potential. The proximity detection machine learning model may have been trained to detect request (or response) proximity to the prohibited topics in the model inputs using supervised learning techniques with labeled datasets containing examples of requests (or responses) at various proximity levels to restricted content categories. For example, the proximity detection machine learning model may process request data 206 through transformer-based neural networks that may generate embedding vectors for each request, calculate cosine similarity scores between request vectors and prohibited topic vectors, and output proximity measurements ranging from zero to one, where values approaching one may indicate closer proximity to prohibited content areas.

With continued reference to FIG. 2, attack detection system 160 may determine, based on each corresponding set of request metrics for the communication session, a drift metric indicating a request drift (or response drift) toward the one or more prohibited topics through analysis of proximity trends across multiple communication exchanges. The drift metric calculation process may involve analyzing sequences of request metrics (or response metrics) associated with sequential request identifiers 203 to identify patterns of gradual movement toward prohibited content boundaries. Attack detection system 160 may apply statistical analysis techniques to detect systematic increases in proximity values over time, indicating potential crescendo attacks where users may approach prohibited topics through incremental steps rather than direct attempts. For example, attack detection system 160 may calculate moving averages of proximity scores across sequential requests, apply regression analysis to identify upward trends in proximity measurements, and generate composite drift scores that may combine proximity trends from multiple prohibited topic categories, with drift calculations incorporating timestamp 212 information to account for temporal spacing between requests and communication parameters 215 to weight drift measurements based on contextual factors.

Attack detection system 160 may detect crescendo attacks where users may approach prohibited topics, back away, and return from different angles to bypass controls through sophisticated pattern recognition algorithms that may identify cyclical proximity behaviors and strategic retreat patterns. The crescendo attack detection process may involve analyzing sequences of request metrics (or response metrics) to identify patterns where proximity values may increase toward prohibited topic boundaries, then decrease to safer levels, followed by renewed approaches from alternative conversational directions. Attack detection system 160 may maintain long-term memory of user interaction history to detect patterns across extended conversations that may span multiple communication sessions or extended time periods. For example, attack detection system 160 may implement sliding window analysis techniques that may examine proximity patterns across sequences of ten to fifty requests (or responses), apply pattern matching algorithms to identify characteristic crescendo attack signatures such as sawtooth proximity patterns or spiral approach behaviors, and maintain persistent user profiles that may track proximity approach attempts across multiple sessions to detect coordinated long-term manipulation campaigns.

Attack detection system 160 may perform statistical deviation analysis to identify prompting behavior that may be multiple standard deviations away from normal user patterns through comparison of individual user behaviors against established baseline metrics for typical communication patterns. The statistical analysis process may involve calculating standard deviations for various communication characteristics, including request frequency, proximity score distributions, linguistic complexity measures, and temporal spacing patterns derived from timestamp 212 data. Attack detection system 160 may establish baseline behavior profiles for different user categories and communication contexts, enabling detection of anomalous behaviors that may deviate significantly from expected patterns. For example, attack detection system 160 may calculate mean and standard deviation values for request submission rates using timestamp 212 intervals, analyze vocabulary complexity distributions within request data 206 to identify unusual linguistic patterns, and apply z-score calculations to identify users whose communication parameters 215 may fall more than two or three standard deviations outside normal ranges, with such deviations potentially indicating automated attack tools, coordinated manipulation attempts, or other forms of malicious activity.

Attack detection system 160 may determine, based on the drift metric meeting a drift threshold, a plurality of communication session parameters that may provide additional context for threat assessment and malicious activity detection. The drift threshold determination process may involve comparing calculated drift metrics against predetermined threshold values that may indicate when conversation trajectories may pose security risks or violate acceptable use policies. When drift metrics may exceed established thresholds, attack detection system 160 may initiate enhanced monitoring procedures that may collect additional communication session parameters for comprehensive threat analysis. For example, attack detection system 160 may establish drift threshold values of 0.3 for low-risk content categories and 0.6 for high-risk prohibited topics, automatically trigger parameter collection processes when drift metrics may meet or exceed these thresholds, and gather communication parameters 215 including network routing information, device fingerprinting data, linguistic analysis results, and behavioral biometric measurements that may provide additional evidence for malicious activity determination.

Attack detection system 160 may determine, based on the plurality of communication session parameters and the drift metric, that the communication session may be malicious through comprehensive analysis that may combine multiple threat indicators into unified risk assessments. In some implementations, the malicious session determination process may involve applying weighted scoring algorithms that may consider drift metric values alongside communication session parameters to generate composite threat scores that may meet or exceed malicious activity thresholds. Attack detection system 160 may utilize machine learning models trained on historical attack data to identify combinations of drift patterns and session parameters that may correlate with confirmed malicious activities. For example, attack detection system 160 may apply ensemble decision-making algorithms that may combine drift metric scores with communication parameters 215 such as geographic location indicators, device behavior patterns, and linguistic anomaly measurements, where sessions exhibiting drift metrics above 0.7 combined with suspicious geographic origins and unusual typing patterns may receive composite threat scores meeting or exceeding malicious activity thresholds of 0.8, triggering immediate security response protocols.

Based on determining that the communication session may be malicious, attack detection system 160 may end the communication session through immediate termination procedures that may prevent further malicious activities and protect artificial intelligence agents from continued manipulation attempts. The session termination process may involve closing network connections, invalidating session tokens, and implementing temporary or permanent access restrictions for the associated client device or user account. Attack detection system 160 may coordinate session termination activities across multiple system components to ensure complete disconnection and prevent reconnection attempts through alternative communication pathways. For example, attack detection system 160 may send termination commands to communication subsystem 162 to close active network connections, update access control lists to block future connection attempts from the associated client device, generate security incident reports containing request identifier 203 sequences, timestamp 212 records, and communication parameters 215 for forensic analysis, and implement graduated response protocols where first-time offenders may receive temporary blocks while repeat offenders may face permanent access restrictions.

Attack detection system 160 may implement comprehensive communication session parameter analysis that may enable detection of sophisticated concealment techniques and behavioral anomalies through systematic examination of multiple communication characteristics. The communication session parameter determination process may involve analyzing various aspects of client device behavior, network routing patterns, and temporal interaction characteristics to identify potential indicators of malicious activity or deceptive practices. Attack detection system 160 may collect and analyze communication parameters that may extend beyond simple content analysis to include technical signatures, behavioral biometrics, and network infrastructure characteristics that may reveal attempts to mask true user identity or automate attack processes. For example, attack detection system 160 may monitor network packet timing variations, analyze keystroke dynamics and mouse movement patterns where available), examine connection establishment protocols, and evaluate session persistence behaviors to build comprehensive profiles of communication session characteristics that may indicate legitimate user interactions versus automated or concealed attack attempts.

Referring to FIG. 4, attack detection system 160 may generate and maintain detailed attack profile records that may capture various concealment and behavioral indicators associated with potentially malicious communication sessions. An attack profile identifier 403 may uniquely identify each attack profile record within the system, enabling attack detection system 160 to track and correlate attack patterns across multiple communication sessions and time periods. Attack detection system 160 may utilize attack profile identifier 403 to establish relationships between different attack attempts and identify coordinated campaigns that may involve multiple client devices or extended time periods. Attack profile identifier 403 may incorporate timestamp information, geographic indicators, and session characteristics to create unique identifiers that may facilitate forensic analysis and pattern recognition across large datasets of communication sessions. For example, attack profile identifier 403 may combine hexadecimal session identifiers with geographic location codes and timestamp elements to create unique identifiers such as "AP6Z86B273-US20250904", enabling attack detection system 160 to quickly identify and correlate related attack attempts while maintaining referential integrity across distributed system components and long-term data storage repositories.

Attack detection system 160 may generate a concealment parameter that may indicate whether the client device may be using a virtual private network server for transmitting requests through analysis of network routing characteristics and connection establishment patterns. The concealment parameter generation process may involve examining network packet headers, analyzing routing path information, and identifying characteristics that may indicate traffic routing through intermediary servers or proxy systems. The use of the virtual private network server may indicate concealment attempts where users may seek to mask their true geographic location, network identity, or other identifying characteristics that could be used for legitimate security monitoring purposes. Attack detection system 160 may employ multiple detection techniques to identify virtual private network usage, including analysis of network latency patterns, examination of Internet Protocol (IP) address reputation databases, and detection of characteristic network signatures associated with commercial virtual private network services. For example, attack detection system 160 may analyze roundtrip time measurements between client requests and server responses to identify unusual latency patterns that may indicate traffic routing through multiple geographic locations, compare client IP addresses against known virtual private network server ranges maintained in threat intelligence databases, and examine network packet characteristics such as time-to-live values and routing header information that may reveal the presence of intermediary network infrastructure used for concealment purposes.

With continued reference to FIG. 4, a concealment parameter 406 may store boolean or categorical values that may indicate the detection status of concealment techniques associated with each attack profile record. The concealment parameter 406 may contain values such as "True" or "False" to indicate whether concealment activities have been detected, or may contain more detailed categorical information that may specify the type of concealment technique identified, such as virtual private network usage, proxy server routing, or anonymization service utilization. Attack detection system 160 may update the concealment parameter 406 based on ongoing analysis of network characteristics and may maintain historical records of concealment detection across multiple communication sessions associated with the same client device or user account. Concealment parameter 406 may be utilized in combination with other attack profile characteristics to generate composite risk scores and determine appropriate security response actions. For example, attack detection system 160 may set the concealment parameter 406 to "True" when detecting client connections originating from known commercial virtual private network services, may assign categorical values such as "VPN-Commercial" or "Proxy-Anonymous" to specify the type of concealment detected, and may maintain temporal records of concealment parameter 406 changes to identify patterns where users may alternate between concealed and non-concealed connection methods as part of sophisticated attack strategies.

Attack detection system 160 may determine a request cadence associated with the communication session through analysis of temporal patterns and frequency characteristics of client requests in relation to artificial intelligence agent responses. The request cadence determination process may involve calculating time intervals between sequential requests, analyzing the relationship between request submission timing and response delivery timing, and identifying patterns that may indicate automated request generation or unusual user behavior. The request cadence may indicate a frequency of requests in relation to previous responses, providing quantitative measurements that may distinguish between natural human interaction patterns and automated or scripted attack behaviors. Attack detection system 160 may maintain statistical baselines for normal request cadence patterns across different user populations and communication contexts, enabling detection of anomalous timing behaviors that may deviate significantly from expected interaction patterns. For example, attack detection system 160 may calculate mean time intervals between consecutive requests using timestamp data, analyze the correlation between response delivery times and subsequent request submission times to identify whether users may be reading and processing responses before submitting followup requests, and apply statistical analysis techniques to identify request cadence patterns that may fall outside normal ranges, such as requests submitted at precisely regular intervals that may indicate automated scripting or requests submitted immediately after response delivery without sufficient time for human comprehension and formulation of follow-up questions.

Attack detection system 160 may incorporate behavioral biometrics analysis that may examine typing speed, mouse movement patterns, and keyboard interaction cadence (when available) to identify user characteristics and detect potential impersonation or automation attempts. The behavioral biometrics analysis process may involve monitoring client-side interaction patterns through specialized monitoring capabilities that may capture keystroke timing, mouse movement trajectories, and interaction rhythm characteristics that may be unique to individual users. Attack detection system 160 may analyze typing speed variations, pause patterns between keystrokes, and mouse movement characteristics to build behavioral profiles that may distinguish between legitimate users and potential attackers or automated systems. The behavioral biometric measurements may provide additional layers of authentication and threat detection that may complement content-based analysis and network-based concealment detection. For example, attack detection system 160 may measure inter-keystroke timing intervals to identify typing rhythm patterns unique to individual users, analyze mouse movement velocity and acceleration patterns to detect characteristics consistent with human versus automated interaction, and monitor keyboard interaction cadence including typing burst patterns and pause durations that may indicate whether users may be composing responses in real-time versus copying pre-written text from external sources.

With continued reference to FIG. 4, cadence data 409 may store detailed timing and frequency information associated with request submission patterns for each attack profile record. Cadence data 409 may contain structured data representations of temporal interaction characteristics, including statistical measurements of request frequency, timing interval distributions, and correlation patterns between requests and responses. Attack detection system 160 may populate cadence data 409 with comprehensive timing analysis results that may enable identification of automated attack tools, coordinated attack campaigns, and other temporal anomalies that may indicate malicious activity. Cadence data 409 may be updated continuously as new requests are processed within communication sessions, enabling real-time detection of cadence anomalies and adaptive response to changing attack patterns. For example, cadence data 409 may contain JSON-formatted data structures that may include mean request intervals, standard deviation measurements, correlation coefficients between response delivery and subsequent request timing, and frequency distribution histograms that may characterize the temporal signature of each communication session, with this data being utilized by machine learning models to classify communication sessions as exhibiting human-like versus automated interaction patterns.

Attack detection system 160 may analyze machine signatures beyond IP addresses through examination of unique computer timing signatures for signal transmission and reception that may provide device-level identification capabilities even when network-level concealment techniques may be employed. The machine signature analysis process may involve measuring network packet timing characteristics, analyzing transmission delay patterns, and identifying unique characteristics of client device network stacks that may persist across different network connections and concealment attempts. Attack detection system 160 may examine factors such as TCP timestamp options, network packet size preferences, and protocol implementation characteristics that may be specific to particular operating systems, network hardware configurations, or software implementations. The machine signature analysis may enable attack detection system 160 to identify when the same physical device may be used for multiple attack attempts, even when different IP addresses, user accounts, or concealment techniques may be employed. For example, attack detection system 160 may analyze TCP initial sequence number generation patterns that may be characteristic of specific operating system implementations, measure network packet inter-arrival time distributions that may reflect unique characteristics of client device network hardware, and examine HTTP header ordering and capitalization patterns that may be specific to particular web browser implementations, enabling identification of device-level signatures that may persist across multiple communication sessions and provide evidence of coordinated attack campaigns originating from the same physical hardware.

Communication subsystem 162 may monitor login frequency patterns and session continuation behavior as indicators of malicious activity through systematic tracking of user authentication events and session management characteristics across multiple communication sessions. The login frequency monitoring process may involve analyzing patterns of session establishment, authentication attempts, and session termination behaviors that may indicate automated attack tools, credential stuffing attempts, or other forms of malicious access patterns. Communication subsystem 162 may maintain statistical baselines for normal login frequency patterns across different user populations and may identify anomalous behaviors that may deviate significantly from expected authentication patterns. The session continuation behavior analysis may examine how users may maintain and manage communication sessions over time, including patterns of session persistence, reconnection behaviors, and multi-session coordination that may indicate sophisticated attack strategies. For example, communication subsystem 162 may track the frequency of new session establishment attempts from the same client device or IP address range, analyze patterns where users may rapidly cycle through multiple authentication attempts or session establishments, and/or monitor session continuation behaviors such as maintaining multiple simultaneous sessions or exhibiting unusual session persistence patterns that may indicate automated tools designed to maintain persistent access for extended attack campaigns.

With continued reference to FIG. 4, parameter data 412 may store additional communication session characteristics and metadata that may supplement concealment detection and cadence analysis for comprehensive attack profile assessment. Parameter data 412 may contain structured information about various technical and behavioral characteristics associated with each communication session, including network configuration details, client device characteristics, linguistic analysis results, and other contextual information that may contribute to malicious activity determination. Attack detection system 160 may populate parameter data 412 with diverse data types and formats that may enable multi-dimensional analysis of communication session characteristics and support machine learning models that may require comprehensive feature sets for accurate threat classification. Parameter data 412 may be continuously updated as new information becomes available during communication sessions, enabling dynamic risk assessment and adaptive security response based on evolving session characteristics. For example, parameter data 412 may contain structured data including client device user agent strings, supported encryption cipher suites, geographic location estimates derived from network routing analysis, linguistic complexity measurements from request content analysis, and behavioral consistency scores that may compare current session characteristics against historical patterns associated with the same user account or device identifier, with this comprehensive parameter set enabling sophisticated machine learning models to distinguish between legitimate user sessions and various types of malicious attack attempts.

Attack detection system 160 may add the concealment parameter and the request cadence to the plurality of communication session parameters through systematic integration of concealment detection results and temporal analysis measurements into comprehensive session assessment frameworks. The parameter integration process may involve combining concealment parameter 406 and cadence data 409 with other communication session characteristics to create unified data structures that may support multi-dimensional threat analysis and machine learning-based classification algorithms.

In some implementations, attack detection system 160 may ensure that the concealment parameter and request cadence measurements may be properly weighted and normalized relative to other communication session parameters to prevent bias in composite risk scoring and automated decision-making processes. The integrated communication session parameters may provide comprehensive profiles of communication sessions that may enable detection of sophisticated attack strategies that may combine multiple concealment techniques with carefully orchestrated timing patterns to evade individual detection mechanisms. For example, attack detection system 160 may create structured parameter arrays that may include concealment parameter 406 as a boolean or categorical feature, incorporate cadence data 409 as normalized numerical features representing timing characteristics, and combine these elements with parameter data 412 containing additional session characteristics, resulting in comprehensive feature vectors that may be processed by ensemble machine learning models to generate composite threat scores that may account for the complex interactions between concealment techniques, temporal anomalies, and other behavioral indicators of malicious activity.

Attack detection system 160 may generate, based on the plurality of communication session parameters, an attack profile that may consolidate various threat indicators and behavioral characteristics into structured data representations suitable for pattern recognition and similarity analysis. The attack profile generation process may involve aggregating concealment parameters, request cadence measurements, and additional communication session characteristics into standardized data formats that may enable systematic comparison against historical attack patterns. Attack detection system 160 may create attack profiles that may serve as comprehensive fingerprints of malicious communication sessions, capturing both technical characteristics and behavioral patterns that may distinguish attack attempts from legitimate user interactions.

In some implementations, the attack profile may include the concealment parameter and an indication of the request cadence, providing quantitative measurements of concealment techniques and temporal interaction patterns that may be characteristic of specific attack methodologies. For example, attack detection system 160 may generate attack profiles containing structured data elements such as concealment status indicators, statistical measurements of request timing patterns, geographic location estimates, linguistic complexity scores, and behavioral biometric measurements, with each attack profile being assigned unique identifiers and timestamp information that may enable tracking of attack evolution over time and correlation of related attack attempts across multiple communication sessions.

In some implementations, attack detection system 160 may compare the attack profile to known attack profiles to determine whether the attack profile may match previous attack profiles through systematic analysis of similarity patterns and characteristic matching algorithms. The comparison process may involve analyzing multiple dimensions of attack profile characteristics to identify patterns that may indicate coordinated attack campaigns, repeated attack methodologies, or evolution of attack techniques over time. Attack detection system 160 may maintain comprehensive databases of known attack profiles that may include historical records of confirmed malicious activities, enabling pattern recognition capabilities that may improve over time as additional attack data becomes available. The attack profile comparison process may utilize various analytical techniques including statistical correlation analysis, pattern matching algorithms, and machine learning-based similarity assessment to identify relationships between current attack attempts and previously observed malicious activities. For example, attack detection system 160 may compare concealment parameter patterns to identify cases where the same virtual private network services or proxy configurations may be used across multiple attack attempts, analyze request cadence signatures to detect characteristic timing patterns that may be associated with specific automated attack tools, and examine combinations of communication session parameters that may indicate coordinated attack campaigns involving multiple client devices or extended time periods.

Attack detection system 160 may input the attack profile and the known attack profiles into a similarity machine learning model to obtain a plurality of similarity metrics between the attack profile and each known attack profile through sophisticated pattern recognition algorithms that may quantify relationships between different attack characteristics. The similarity machine learning model may have been trained, using a training dataset, to determine a degree of similarity of a given attack profile and a given known attack profile by processing labeled examples of attack profiles with known relationships and similarity levels. The similarity machine learning model may utilize various neural network architectures, including deep learning models that may process high-dimensional attack profile data to identify complex patterns and relationships that may not be apparent through traditional statistical analysis methods.

In some implementations, the similarity metrics generation process may involve computing numerical similarity scores that may range from zero to one, where higher values may indicate greater similarity between attack profiles and stronger evidence of related attack activities. For example, the similarity machine learning model may utilize transformer-based neural networks that may process attack profile feature vectors containing concealment parameters, cadence measurements, and communication session characteristics, apply attention mechanisms to identify the most discriminative features for similarity assessment, and generate similarity scores such as 0.85 for attack profiles sharing similar concealment techniques and timing patterns, 0.23 for attack profiles with different characteristics, and 0.92 for attack profiles that may represent repeated attempts using identical attack methodologies.

Attack detection system 160 may determine whether a similarity metric of the plurality of similarity metrics may meet a similarity threshold through systematic evaluation of similarity scores against predetermined threshold values that may indicate when attack profiles may represent related or repeated malicious activities. The similarity threshold determination process may involve comparing calculated similarity metrics against established threshold levels that may define boundaries for attack profile matching and correlation decisions. Attack detection system 160 may implement multiple similarity threshold levels that may correspond to different confidence levels and response actions, enabling graduated responses based on the strength of similarity evidence between attack profiles. The similarity threshold evaluation may consider various factors including the reliability of similarity measurements, the potential impact of false positive matches, and the operational requirements for attack response and mitigation activities. For example, attack detection system 160 may establish similarity threshold values of 0.7 for high-confidence attack profile matches that may trigger immediate security responses, threshold values of 0.5 for moderate-confidence matches that may generate security alerts and enhanced monitoring, and threshold values of 0.3 for low-confidence matches that may be logged for further analysis, with these threshold levels being dynamically adjusted based on historical accuracy measurements and operational feedback from security analysts.

Based on determining that the similarity metric of the plurality of similarity metrics meets (or exceeds) the similarity threshold, attack detection system 160 may indicate that the attack profile matches a known attack profile through automated classification processes that may identify relationships between current attack attempts and historical malicious activities. The attack profile matching process may involve generating structured notifications that may specify the degree of similarity detected, the characteristics of the matched known attack profile, and recommended response actions based on the historical context of similar attack attempts. Attack detection system 160 may maintain detailed records of attack profile matches that may enable tracking of attack campaign evolution, identification of persistent threat actors, and assessment of attack technique effectiveness over time. The attack profile matching process may provide valuable intelligence for security response coordination and may enable proactive defense measures based on knowledge of previously observed attack patterns and their associated threat levels. For example, attack detection system 160 may generate attack profile match notifications containing similarity scores, matched attack profile identifiers, timestamp information, and recommended security response levels, where matches with similarity scores above 0.8 may indicate high-probability repeated attack attempts that may warrant immediate session termination and access blocking, while matches with similarity scores between 0.5 and 0.8 may indicate related attack activities that may require enhanced monitoring and additional security controls.

Based on determining that the attack profile matches a previous attack profile, attack detection system 160 may end the communication session and store the attack profile in a database through coordinated security response actions that may prevent continued malicious activities while preserving attack intelligence for future threat detection and analysis. The session termination and data storage process may involve immediate disconnection of the malicious communication session, implementation of access restrictions to prevent reconnection attempts, and systematic storage of attack profile data in structured database formats that may support future pattern recognition and threat intelligence activities. Attack detection system 160 may coordinate session termination activities across multiple system components to ensure complete disconnection and may implement various levels of access restrictions based on the severity and characteristics of the matched attack profile.

The attack profile storage process may involve organizing attack profile data in database structures that may enable efficient querying, pattern analysis, and correlation with future attack attempts, while maintaining data integrity and security controls that may protect sensitive threat intelligence information. For example, attack detection system 160 may execute session termination commands that may close network connections, invalidate authentication tokens, and update access control lists to block future connection attempts from the associated client device, while simultaneously storing attack profile data in relational database tables that may include attack profile identifiers, similarity match results, timestamp information, and cross-references to related attack profiles, enabling comprehensive threat intelligence databases that may support machine learning model training and security analyst investigations.

Attack detection system 160 may include self-correction and self-learning capabilities to adapt to new attack patterns and improve detection accuracy over time through continuous analysis of attack detection performance and automated adjustment of detection parameters and model configurations. The self-correction process may involve monitoring the accuracy of attack profile matching decisions, analyzing false positive and false negative rates, and implementing automated adjustments to similarity thresholds and detection algorithms based on operational feedback and performance measurements. Attack detection system 160 may utilize machine learning techniques that may enable continuous improvement of attack detection capabilities through analysis of new attack data and refinement of pattern recognition models.

The self-learning capabilities may enable attack detection system 160 to identify emerging attack techniques that may not have been present in original training datasets and to adapt detection algorithms to maintain effectiveness against evolving threat landscapes. For example, attack detection system 160 may implement reinforcement learning algorithms that may adjust similarity threshold values based on the accuracy of previous attack profile matching decisions, utilize online learning techniques that may update similarity machine learning models with new attack profile data as attacks are confirmed or refuted by security analysts, and employ ensemble learning methods that may combine multiple detection approaches to improve overall accuracy and reduce bias in attack detection decisions, with these self-learning capabilities enabling continuous adaptation to new attack vectors while maintaining high detection accuracy and low false positive rates across diverse threat scenarios.

Attack detection system 160 may implement comprehensive demographic profiling capabilities that may enable sophisticated analysis of user characteristics and behavioral patterns through systematic examination of location data, interaction timing, and linguistic characteristics associated with communication sessions. The demographic profiling process may involve collecting and analyzing multiple data dimensions that may provide insights into user identity, behavior patterns, and potential anomalies that may indicate malicious activities or impersonation attempts.

In some implementations, attack detection system 160 may utilize demographic profiling to establish baseline behavioral patterns for legitimate users and to identify deviations that may suggest unauthorized access, automated attack tools, or other forms of malicious activity. The demographic profiling capabilities may extend beyond simple geographic location analysis to include sophisticated linguistic pattern recognition, temporal behavior analysis, and multi-dimensional user characteristic assessment that may provide comprehensive user identity verification and threat detection capabilities. For example, attack detection system 160 may analyze communication patterns to determine whether users may be interacting in ways consistent with their established demographic profiles, including factors such as typical interaction times, linguistic complexity levels, geographic consistency, and behavioral rhythm patterns that may be characteristic of individual users or user groups.

Referring to FIG. 5, attack detection system 160 may generate and maintain detailed demographic profile records that may capture various user characteristics and behavioral indicators associated with communication sessions. A profile identifier 503 may uniquely identify each demographic profile record within the system, enabling attack detection system 160 to track and correlate user behavior patterns across multiple communication sessions and extended time periods. Profile identifier 503 may incorporate user account information, session characteristics, and temporal elements to create unique identifiers that may facilitate user behavior analysis and anomaly detection across large datasets of communication activities. Attack detection system 160 may utilize profile identifier 503 to establish relationships between different communication sessions and identify behavioral consistency or inconsistency patterns that may indicate legitimate user activities versus potential impersonation or automated attack attempts. For example, profile identifier 503 may combine user account identifiers with timestamp elements and session characteristics to create unique identifiers such as "USER_6Z86B273" through "USER 6Z86B276", enabling attack detection system 160 to maintain persistent demographic profiles that may track user behavior evolution over time while providing referential integrity across distributed system components and long-term behavioral analysis repositories.

Attack detection system 160 may determine, for the communication session, a location of the client device through analysis of network routing information, geographic IP address databases, and other location-indicating characteristics that may provide geographic context for user interactions. The location determination process may involve examining network packet routing paths, analyzing IP address geographic assignments, and correlating multiple location indicators to establish reliable geographic positioning for client devices. Attack detection system 160 may utilize location information to assess geographic consistency with established user profiles and to identify potential anomalies such as impossible travel scenarios or access from high-risk geographic regions.

The location analysis may provide contextual information that may be combined with other demographic characteristics to build comprehensive user profiles and detect geographic anomalies that may indicate account compromise or malicious access attempts. For example, attack detection system 160 may analyze network routing headers to trace packet paths through geographic regions, query IP geolocation databases to determine approximate geographic coordinates for client IP addresses, and apply geographic consistency algorithms to identify cases where users may appear to access systems from multiple distant locations within timeframes that may be inconsistent with physical travel possibilities.

With continued reference to FIG. 5, a request location 509 may store geographic information associated with each demographic profile record, including location estimates, geographic consistency measurements, and location-based risk assessments. Request location 509 may contain structured geographic data that may specify country, region, city, and coordinate information derived from network analysis and IP geolocation services. Attack detection system 160 may populate request location 509 with comprehensive location analysis results that may enable geographic pattern recognition and location-based anomaly detection across multiple communication sessions. Request location 509 may be continuously updated as new location information becomes available during communication sessions, enabling real-time geographic consistency monitoring and adaptive security response based on location-based risk factors. For example, request location 509 may contain location identifiers such as “Location_1” through “Location_4” that may represent structured geographic data including country codes, regional identifiers, city names, and coordinate ranges, with this location information being utilized by demographic profiling algorithms to assess geographic consistency and identify location-based anomalies that may indicate unauthorized access attempts or coordinated attack campaigns originating from multiple geographic regions.

Attack detection system 160 may determine a cadence of the plurality of requests from the client device through comprehensive analysis of temporal interaction patterns, request frequency characteristics, and timing relationships between sequential communication exchanges. The cadence determination process may involve calculating statistical measurements of request timing intervals, analyzing the consistency of interaction rhythms, and identifying patterns that may be characteristic of individual users or indicative of automated systems. Attack detection system 160 may examine factors such as mean request intervals, timing variability, and correlation patterns between request submission and response processing to build temporal behavioral profiles that may distinguish between human and automated interaction patterns. The cadence analysis may provide behavioral biometric information that may be unique to individual users and may serve as an additional authentication factor and anomaly detection mechanism. For example, attack detection system 160 may calculate mean time intervals between consecutive requests, analyze standard deviation measurements of timing patterns to assess consistency levels, and apply statistical correlation analysis to identify relationships between response delivery times and subsequent request submission timing that may indicate whether users may be processing responses before formulating follow-up requests or submitting pre-prepared request sequences characteristic of automated attack tools.

Request cadence 506 may be a field that may store detailed temporal interaction characteristics associated with each demographic profile record, including statistical measurements of request timing patterns, frequency distributions, and behavioral rhythm indicators. Request cadence 506 may contain structured temporal data that may quantify interaction timing characteristics and enable comparison against established behavioral baselines for individual users or user groups. Attack detection system 160 may populate request cadence 506 with comprehensive timing analysis results that may enable temporal pattern recognition and cadence-based anomaly detection across multiple communication sessions. Request cadence 506 may be dynamically updated as new timing information becomes available during ongoing communication sessions, enabling real-time cadence monitoring and adaptive behavioral assessment based on evolving interaction patterns. For example, request cadence 506 may contain structured data representations that may include statistical measurements such as mean request intervals, timing variability coefficients, frequency distribution histograms, and correlation measurements between request timing and response characteristics, with this cadence information being utilized by behavioral analysis algorithms to assess temporal consistency and identify timing-based anomalies that may indicate automated interaction tools or behavioral impersonation attempts.

Attack detection system 160 may determine linguistic features and patterns within the plurality of requests through sophisticated natural language processing analysis that may examine vocabulary usage, grammatical structures, writing style characteristics, and language proficiency indicators. The linguistic analysis process may involve tokenizing request text, analyzing syntactic patterns, measuring vocabulary complexity, and identifying characteristic linguistic markers that may be associated with specific demographic groups, educational backgrounds, or native language characteristics. Attack detection system 160 may examine factors such as sentence structure complexity, vocabulary diversity, grammatical error patterns, and idiomatic expression usage to build linguistic profiles that may be characteristic of individual users or demographic categories.

In some implementations, the linguistic feature analysis may provide insights into user characteristics such as educational level, native language background, and writing style consistency that may serve as additional authentication factors and demographic verification mechanisms. For example, attack detection system 160 may apply part-of-speech tagging algorithms to analyze grammatical structure patterns, calculate vocabulary diversity scores using type-token ratio measurements, analyze sentence length distributions and syntactic complexity indicators, and identify characteristic error patterns or linguistic markers that may indicate whether English may be the user’s first language based on linguistic patterns and interaction speed, with these linguistic characteristics being combined to create comprehensive linguistic behavioral profiles.

The communication parameters may include analysis of whether English may be the user’s first language based on linguistic patterns and interaction speed through examination of grammatical structures, vocabulary usage patterns, and temporal characteristics of text composition. Attack detection system 160 may analyze linguistic indicators such as grammatical error types, sentence construction patterns, vocabulary selection preferences, and idiomatic expression usage that may be characteristic of native versus non-native English speakers. The linguistic proficiency analysis may examine factors such as preposition usage accuracy, article selection patterns, verb tense consistency, and syntactic complexity levels that may provide insights into language background and proficiency levels.

In some implementations, attack detection system 160 may correlate linguistic analysis results with interaction timing patterns to assess whether text composition speed and complexity may be consistent with native language proficiency or may indicate translation tool usage or non-native language processing. For example, attack detection system 160 may analyze grammatical error patterns such as article omission or incorrect preposition usage that may be characteristic of specific native language backgrounds, measure text composition timing relative to linguistic complexity to identify cases where users may be composing responses more slowly than expected for native speakers, and examine vocabulary selection patterns and idiomatic expression usage that may indicate native versus non-native English language proficiency levels.

Attack detection system 160 may generate, based on the location of the client device, the cadence of the plurality of requests from the client device, and the linguistic features and patterns within the plurality of requests, a demographic profile for the communication session through comprehensive integration of geographic, temporal, and linguistic characteristics into unified user profile representations. The demographic profile generation process may involve combining location analysis results, cadence measurements, and linguistic feature assessments into structured data formats that may enable systematic comparison against established user baselines and demographic category patterns.

Attack detection system 160 may apply weighting algorithms that may account for the relative importance of different demographic characteristics and may generate composite demographic scores that may quantify the consistency of observed characteristics with expected user profiles. The demographic profile generation may create comprehensive user behavioral fingerprints that may capture multiple dimensions of user characteristics and enable sophisticated anomaly detection based on multi-dimensional behavioral analysis. For example, attack detection system 160 may combine geographic location consistency scores derived from request location 509, temporal behavioral measurements from request cadence 506, and linguistic proficiency assessments to generate composite demographic profiles containing structured elements such as geographic risk scores, temporal consistency indicators, linguistic proficiency classifications, and behavioral anomaly measurements that may be stored and utilized for ongoing user authentication and threat detection activities.

With continued reference to FIG. 5, request parameters 512 may store additional demographic and behavioral characteristics that may supplement location, cadence, and linguistic analysis for comprehensive demographic profile assessment. Request parameters 512 may contain structured information about various user characteristics and contextual factors that may contribute to demographic profiling accuracy and anomaly detection capabilities. Attack detection system 160 may populate request parameters 512 with diverse demographic indicators that may enable multi-dimensional user profile analysis and support machine learning models that may require comprehensive feature sets for accurate user behavior classification. Request parameters 512 may be continuously updated as new demographic information becomes available during communication sessions, enabling dynamic profile refinement and adaptive behavioral assessment based on evolving user characteristics. For example, request parameters 512 may contain structured data that may include additional demographic indicators such as device type preferences, browser configuration characteristics, time zone consistency measurements, and interaction pattern signatures that may provide supplementary information for demographic profile generation and behavioral anomaly detection algorithms.

Attack detection system 160 may compare the demographic profile to a known demographic profile associated with a user of the client device to determine whether the demographic profile may match the known demographic profile through systematic analysis of behavioral consistency patterns and characteristic alignment measurements. The demographic profile comparison process may involve analyzing multiple dimensions of user characteristics to identify patterns that may indicate consistent user behavior versus potential impersonation, account compromise, or automated attack attempts.

Attack detection system 160 may maintain comprehensive databases of known demographic profiles that may include historical records of confirmed user behavioral patterns, enabling pattern recognition capabilities that may improve over time as additional user interaction data becomes available. The demographic profile comparison process may utilize various analytical techniques including statistical correlation analysis, pattern matching algorithms, and machine learning-based similarity assessment to identify relationships between current user behavior and previously established behavioral baselines. For example, attack detection system 160 may compare geographic location patterns to identify cases where users may be accessing systems from locations inconsistent with historical patterns, analyze temporal interaction characteristics to detect cadence anomalies that may indicate automated tools or different users, and examine linguistic feature consistency to identify cases where writing style or language proficiency may differ significantly from established user profiles.

The communication parameters may include second-order connection analysis to assess risk based on associations with entities connected to the user through examination of network relationships, account associations, and indirect connection patterns that may provide additional context for user risk assessment. Attack detection system 160 may analyze relationships between user accounts, shared network infrastructure, common device characteristics, and other indirect association patterns that may indicate coordinated activities or shared risk factors among different users or accounts. The second-order connection analysis may examine factors such as shared IP address ranges, common device fingerprints, similar behavioral patterns, and temporal correlation patterns that may suggest relationships between different user accounts or communication sessions. Attack detection system 160 may utilize graph analysis techniques to map connection relationships and identify clusters of related accounts or activities that may indicate coordinated attack campaigns or shared risk characteristics. For example, attack detection system 160 may analyze network routing patterns to identify cases where multiple user accounts may share common network infrastructure or proxy services, examine device fingerprint similarities to detect cases where multiple accounts may be accessed from the same physical devices, and apply temporal correlation analysis to identify coordinated timing patterns between different accounts that may indicate orchestrated attack activities or shared control mechanisms.

Based on determining that the demographic profile may not match the known demographic profile, attack detection system 160 may transmit an indication that the demographic profile may not match the known demographic profile through automated notification mechanisms that may alert security systems and authorized personnel about potential user authentication anomalies. The demographic profile mismatch notification process may involve generating structured alert messages that may specify the nature of demographic inconsistencies detected, the severity level of the mismatch, and recommended response actions based on the specific characteristics of the profile discrepancies.

In some implementations, attack detection system 160 may customize notification content to provide clear explanations of demographic anomalies while maintaining appropriate security controls that may prevent disclosure of specific detection mechanisms or sensitive user profile information. The demographic profile mismatch notifications may trigger various security response protocols ranging from enhanced monitoring to immediate access restrictions based on the severity and characteristics of the detected anomalies. For example, attack detection system 160 may generate demographic mismatch notifications containing profile comparison results, anomaly severity scores, timestamp information, and recommended security response levels, where significant geographic location inconsistencies may trigger immediate account security reviews, linguistic pattern anomalies may generate enhanced authentication requirements, and temporal behavior discrepancies may initiate additional user verification procedures to confirm legitimate account access versus potential impersonation or compromise attempts.

Attack detection system 160 may implement sophisticated adversarial analysis capabilities that may enable proactive threat assessment through systematic evaluation of artificial intelligence agent responses from multiple demographic perspectives and objectionability assessment frameworks. The adversarial analysis process may involve deploying specialized adversarial artificial intelligence agents that may simulate different user perspectives and demographic viewpoints to identify potential response content that may be objectionable or inappropriate for specific user populations. Attack detection system 160 may utilize adversarial techniques to anticipate how artificial intelligence agents may drift toward prohibited content areas by systematically testing response boundaries and evaluating content appropriateness across diverse demographic categories.

The adversarial artificial intelligence agent may operate as an independent evaluation system that may analyze response content through demographic-specific lenses to identify potential objectionability issues that may not be apparent through general content analysis approaches. For example, attack detection system 160 may deploy adversarial artificial intelligence agents that may simulate evaluation perspectives representing different age groups, cultural backgrounds, religious affiliations, and sensitivity levels to assess whether response content may be appropriate for specific demographic populations, with these adversarial agents generating objectionability scores that may range from zero to one to quantify potential inappropriateness levels for different demographic categories.

The adversarial artificial intelligence agent may include a machine learning model that may have been trained using demographic profiles for specific demographic groups to determine objectionability metrics associated with response content through supervised learning processes that may incorporate labeled datasets containing examples of content appropriateness across different demographic categories. The training process for the adversarial artificial intelligence agent may involve processing extensive datasets that may contain response examples paired with demographic-specific appropriateness labels, enabling the machine learning model to learn patterns and characteristics that may indicate objectionable content for different user populations.

Attack detection system 160 may utilize transformer-based neural network architectures within the adversarial artificial intelligence agent that may process response text through attention mechanisms designed to identify demographic-sensitive content patterns and generate quantitative objectionability assessments. The demographic profile training data may include characteristics such as age ranges, cultural backgrounds, educational levels, religious affiliations, and sensitivity preferences that may influence content appropriateness perceptions across different user groups. For example, the adversarial artificial intelligence agent may be trained using datasets containing thousands of response examples labeled with appropriateness ratings from different demographic groups, where content involving violence may receive high objectionability scores for younger age demographics while receiving lower scores for adult populations, and content involving religious topics may receive varying objectionability scores based on different cultural and religious background profiles used during the training process.

Attack detection system 160 may input a first response of the plurality of responses into the adversarial artificial intelligence agent to obtain a set of response metrics through systematic evaluation processes that may analyze response content against multiple demographic perspective frameworks simultaneously. The response input process may involve tokenizing response text, applying demographic-specific evaluation models, and generating comprehensive objectionability assessments that may account for various sensitivity factors and appropriateness criteria associated with different user populations. The adversarial artificial intelligence agent may process the first response through multiple evaluation pathways that may correspond to different demographic profiles, generating separate objectionability metrics for each demographic category to provide comprehensive appropriateness assessment coverage.

Attack detection system 160 may coordinate the response evaluation process to ensure that objectionability assessments may be generated efficiently while maintaining accuracy and consistency across different demographic evaluation frameworks. For example, attack detection system 160 may input response text such as "The historical conflict involved significant casualties and strategic military operations" into the adversarial artificial intelligence agent, which may then process this content through demographic-specific evaluation models representing different age groups, cultural sensitivities, and educational backgrounds, generating objectionability scores such as 0.8 for child demographic profiles due to violence references, 0.3 for adult demographic profiles with historical interest, and 0.5 for educational demographic profiles where historical content may be contextually appropriate.

The adversarial artificial intelligence agent may run prompt perturbations and generate different personas in real-time to anticipate how artificial intelligence agents may drift toward prohibited content areas through systematic testing of response boundaries and evaluation of content trajectories across multiple interaction scenarios. The prompt perturbation process may involve generating variations of original prompts that may test different approaches to eliciting potentially problematic responses, enabling the adversarial artificial intelligence agent to identify response patterns that may indicate drift toward prohibited topics. Attack detection system 160 may utilize the adversarial artificial intelligence agent to simulate different user personas that may represent various demographic characteristics, behavioral patterns, and interaction styles to comprehensively evaluate how artificial intelligence agents may respond to diverse user approaches.

The persona generation process may involve creating synthetic user profiles that may incorporate different demographic characteristics, communication styles, and topic interests to test artificial intelligence agent responses across a wide range of potential user interactions. For example, the adversarial artificial intelligence agent may generate prompt variations such as "Tell me about historical conflicts" followed by "What were the most effective military strategies" and "How did these strategies cause casualties" to test whether artificial intelligence agent responses may gradually drift toward violent content, while simultaneously simulating personas representing different age groups, educational backgrounds, and cultural sensitivities to evaluate response appropriateness across multiple demographic perspectives.

Attack detection system 160 may analyze both prompt drift toward prohibited topics and output drift to prohibited data or topics as independent detection vectors through parallel evaluation processes that may monitor conversation trajectories from multiple analytical perspectives simultaneously. The dual-vector analysis approach may involve examining input prompt sequences for gradual movement toward restricted content areas while independently analyzing output response sequences for drift toward prohibited topics or inappropriate data disclosure. Attack detection system 160 may maintain separate analytical pathways for prompt drift detection and output drift detection, enabling comprehensive coverage of potential manipulation attempts that may target either input manipulation or output exploitation strategies.

The independent detection vector approach may provide redundant security coverage that may identify threats that may evade single-vector detection approaches, while enabling correlation analysis between prompt drift patterns and output drift patterns to identify sophisticated attack strategies. For example, attack detection system 160 may simultaneously monitor prompt sequences for gradual approaches toward prohibited topics such as violence or fraud while independently analyzing response sequences for drift toward inappropriate content disclosure, personal information leakage, or policy violations, with correlation analysis identifying cases where prompt manipulation may successfully induce output drift even when individual prompts may not trigger immediate policy violations.

Attack detection system 160 may store the set of response metrics in association with the demographic group through structured data management processes that may organize objectionability assessments according to demographic categories and enable efficient retrieval and analysis of demographic-specific appropriateness measurements. The storage process may involve creating database structures that may link response metrics to specific demographic profile identifiers, enabling systematic tracking of objectionability patterns across different user populations and response categories. Attack detection system 160 may implement data organization schemes that may facilitate efficient querying and analysis of demographic-specific objectionability trends, enabling identification of content patterns that may be consistently problematic for specific demographic groups.

The demographic association storage process may enable longitudinal analysis of objectionability patterns and may support machine learning model refinement through analysis of demographic-specific appropriateness trends over time. For example, attack detection system 160 may store response metrics in relational database tables that may include demographic group identifiers such as "AGE 13_17", "CULTURAL RELIGIOUS_A", and "EDUCATIONAL SECONDARY", with associated objectionability scores and response content identifiers, enabling queries that may retrieve all responses with objectionability scores above 0.7 for specific demographic groups or analysis of objectionability trends across different demographic categories to identify content patterns that may require enhanced filtering or alternative response generation approaches.

The coordinated operation of threat detection components may enable comprehensive analysis of communication patterns through systematic integration of multiple analytical approaches that may work together to identify both immediate and long-term security threats. The dual-agent architecture may function through parallel processing pathways where short-term governance agents may analyze individual communications for immediate policy violations while long-term memory agents may maintain extended conversation histories to detect gradual drift patterns across multiple interaction sessions. The short-term governance agents may process each incoming request and outgoing response through rule-based detection algorithms and content classification models that may identify direct attempts to access prohibited content or bypass security controls. The long-term memory agents may simultaneously analyze the same communications through pattern recognition algorithms that may track conversation trajectories over extended time periods to identify subtle manipulation techniques that may not trigger immediate security alerts.

The information flow between detection components may enable real-time threat assessment through coordinated data sharing mechanisms that may ensure comprehensive coverage of potential attack vectors. Communication monitoring systems may capture and log all request-response exchanges while simultaneously distributing communication data to multiple analytical pathways for parallel processing. Topic detection systems may receive communication content and generate proximity measurements that may quantify relationships between communications and prohibited content categories, while behavioral analysis systems may receive timing and interaction data to assess user behavior patterns and identify anomalous activities. The proximity measurements and behavioral assessments may be combined through weighted scoring algorithms that may generate composite threat scores accounting for both content-based risks and behavioral indicators of malicious intent.

The adversarial analysis capabilities may operate in coordination with primary detection systems to provide proactive threat assessment through systematic evaluation of response content from multiple demographic perspectives. Adversarial agents may receive response content from primary communication channels and process the content through demographic-specific evaluation models that may simulate different user perspectives and sensitivity levels. The adversarial evaluation results may be integrated with primary threat detection outputs to provide comprehensive appropriateness assessments that may account for diverse user population characteristics and potential objectionability concerns. The adversarial agents may also generate prompt perturbations and persona simulations that may test response boundaries and identify potential drift patterns before actual users encounter problematic content.

The attack profile generation and matching processes may coordinate with real-time detection systems to provide historical context and pattern recognition capabilities that may identify coordinated attack campaigns and repeated threat activities. Communication session parameter collection systems may gather concealment indicators, timing characteristics, and behavioral biometrics that may be aggregated into structured attack profiles representing comprehensive fingerprints of potentially malicious activities. The attack profile comparison systems may receive newly generated profiles and compare them against databases of known attack patterns through similarity analysis algorithms that may identify relationships between current activities and previously observed threats. The similarity matching results may be fed back to primary detection systems to influence threat scoring and response decisions based on historical attack intelligence.

The demographic profiling systems may operate in parallel with content analysis systems to provide user authentication and behavioral consistency verification through multi-dimensional user characteristic assessment. Location analysis systems may determine geographic positioning for client devices while linguistic analysis systems may examine communication content for language proficiency indicators and writing style characteristics. Temporal analysis systems may calculate interaction timing patterns and cadence measurements that may be combined with geographic and linguistic data to generate comprehensive demographic profiles. The demographic profile comparison processes may evaluate current user behavior against established baselines to identify potential impersonation attempts or account compromise scenarios that may indicate security threats.

The response generation and transmission systems may coordinate with all detection components to provide appropriate security notifications based on the specific nature and severity of detected threats. Threat classification systems may receive composite threat scores from multiple detection pathways and determine appropriate response levels ranging from passive monitoring to immediate session termination. Response customization systems may generate contextually appropriate security messages that may provide clear policy violation explanations while avoiding disclosure of specific detection mechanisms that could be exploited by malicious actors. The response delivery systems may implement secure transmission protocols and delivery confirmation mechanisms to ensure reliable notification delivery while maintaining system integrity and preventing information leakage.

The self-learning and adaptation mechanisms may coordinate across all system components to provide continuous improvement of detection capabilities through analysis of detection performance and automated adjustment of detection parameters. Performance monitoring systems may track the accuracy of threat detection decisions and analyze false positive and false negative rates across different detection components. Machine learning model update systems may incorporate new attack data and refined pattern recognition models based on operational feedback and emerging threat intelligence. The threshold adjustment systems may modify detection sensitivity levels and similarity matching criteria based on historical performance measurements to maintain optimal detection accuracy while minimizing operational disruption from false alerts.

The database storage and retrieval systems may coordinate with all analytical components to provide persistent storage of attack intelligence and user behavioral data that may support long-term pattern recognition and forensic analysis capabilities. Attack profile storage systems may organize threat intelligence data in structured database formats that may enable efficient querying and correlation analysis across multiple attack campaigns and time periods. User profile storage systems may maintain historical behavioral baselines and demographic characteristics that may support ongoing authentication and anomaly detection processes. The data retrieval systems may provide rapid access to historical attack patterns and user profiles to support real-time threat assessment and decision-making processes across all detection components.

In some implementations, the system may use two monitoring AI agents to monitor are examiner inputs and outputs from a particular AI agent. The first monitoring artificial intelligence agent may operate as an immediate security checkpoint that examines each individual request and response in real-time to identify direct policy violations or malicious content attempts. This agent may utilize rule-based detection algorithms and content classification models to analyze incoming prompts for prohibited keywords, malicious code patterns, and explicit attempts to bypass security controls, while simultaneously evaluating outgoing responses for inappropriate content disclosure or policy violations. The first monitoring agent may process communications through transformer-based neural networks that may tokenize input text, apply semantic analysis to identify topic relationships, and generate proximity scores using vector similarity computations between request embeddings and prohibited topic reference vectors stored in knowledge databases.

The second monitoring artificial intelligence agent may function as a long-term pattern recognition system that maintains extended memory of user interactions and analyzes conversation trajectories across multiple communication sessions to detect subtle manipulation techniques. This agent may identify crescendo attacks where users may approach prohibited topics through incremental steps, back away to safer conversational territory, and return from different angles to systematically test security boundaries without triggering immediate alerts from the first monitoring agent. For example, the second monitoring agent may track a sequence of seemingly innocuous requests about "historical conflicts," followed by questions about "military strategies," and then inquiries about "casualty statistics," recognizing this gradual drift pattern as a potential attempt to elicit violent content even though each individual request may appear acceptable when analyzed in isolation by the first monitoring agent.

Computing Environment

Figure 6:
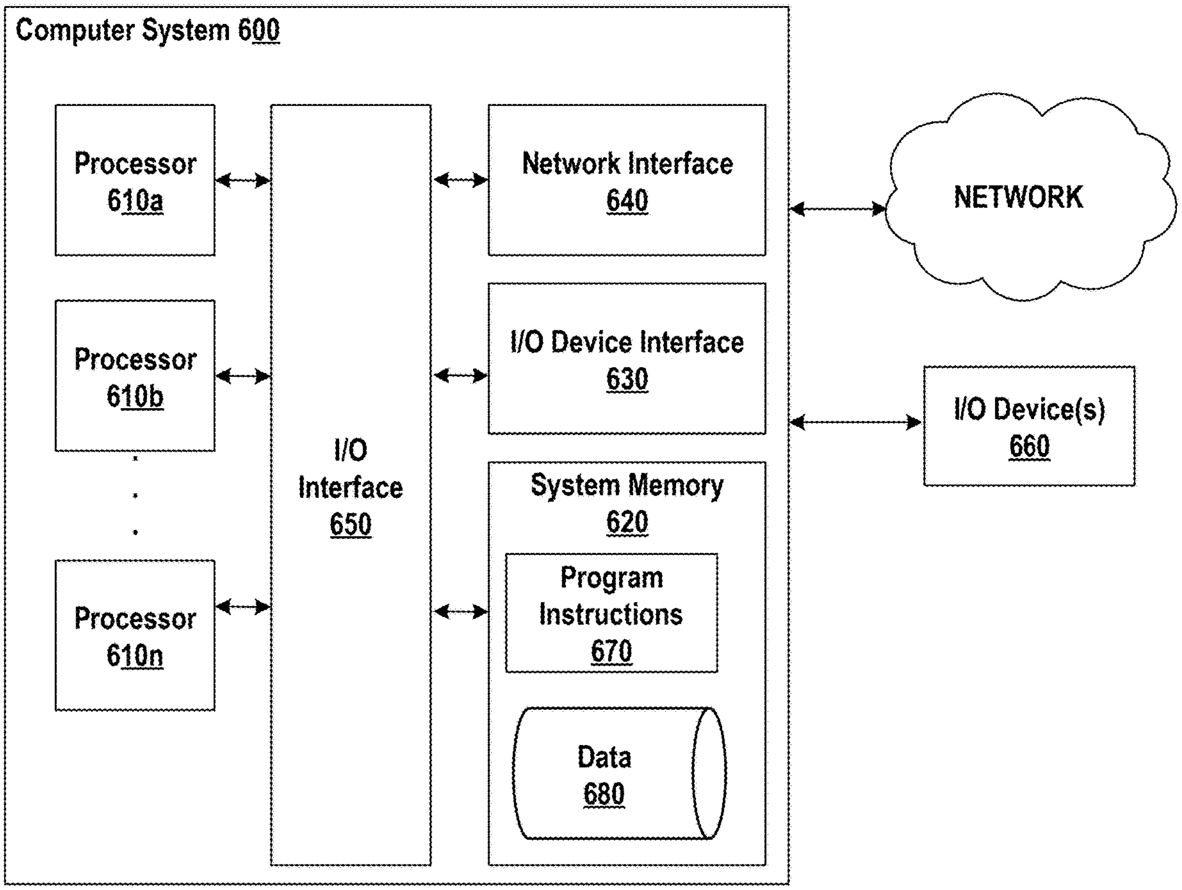
FIG. 6 illustrates an exemplary computing system, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
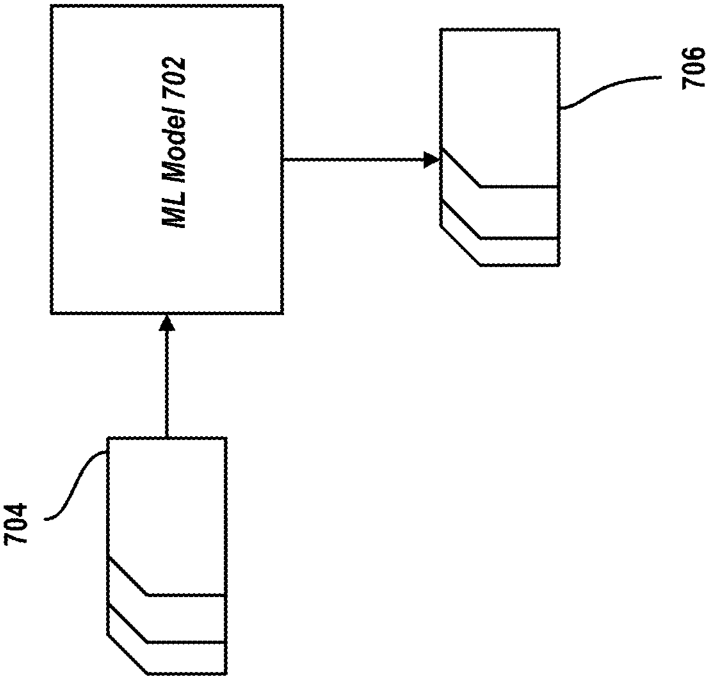
FIG. 7 illustrates exemplary machine learning models, in accordance with one or more embodiments of this disclosure.

FIG. 7 illustrates an exemplary machine learning model 702. According to some examples, the machine learning model may be any model, such as a model for data imputation. For example, the machine learning model may be trained to intake input 704. As a result of inputting the input 704 into the machine learning model, the model may then output an output 706, which may include, for example, an imputed value. Furthermore, as described, the machine learning model may be configured to output a confidence interval or other metric for certainty regarding the outputs. Output 706 may include output parameters.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification or imputation of the machine learning model, and an input known to correspond to that classification or imputation value may be input into an input layer of the machine learning model during training. During testing, an input without a known classification or known imputation value may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from publicly available sources. Such a technique may be used to identify values and generate a corpus that can be accessed to impute values. For example, in some embodiments, if a value is missing, the model may access the corpus to identify relevant information for the missing value. For example, the values can be used to calculate the missing value. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. The specific training samples may be used to generate language in a certain style or in a certain format.

Some concepts in ML-based language models will now be discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 8:
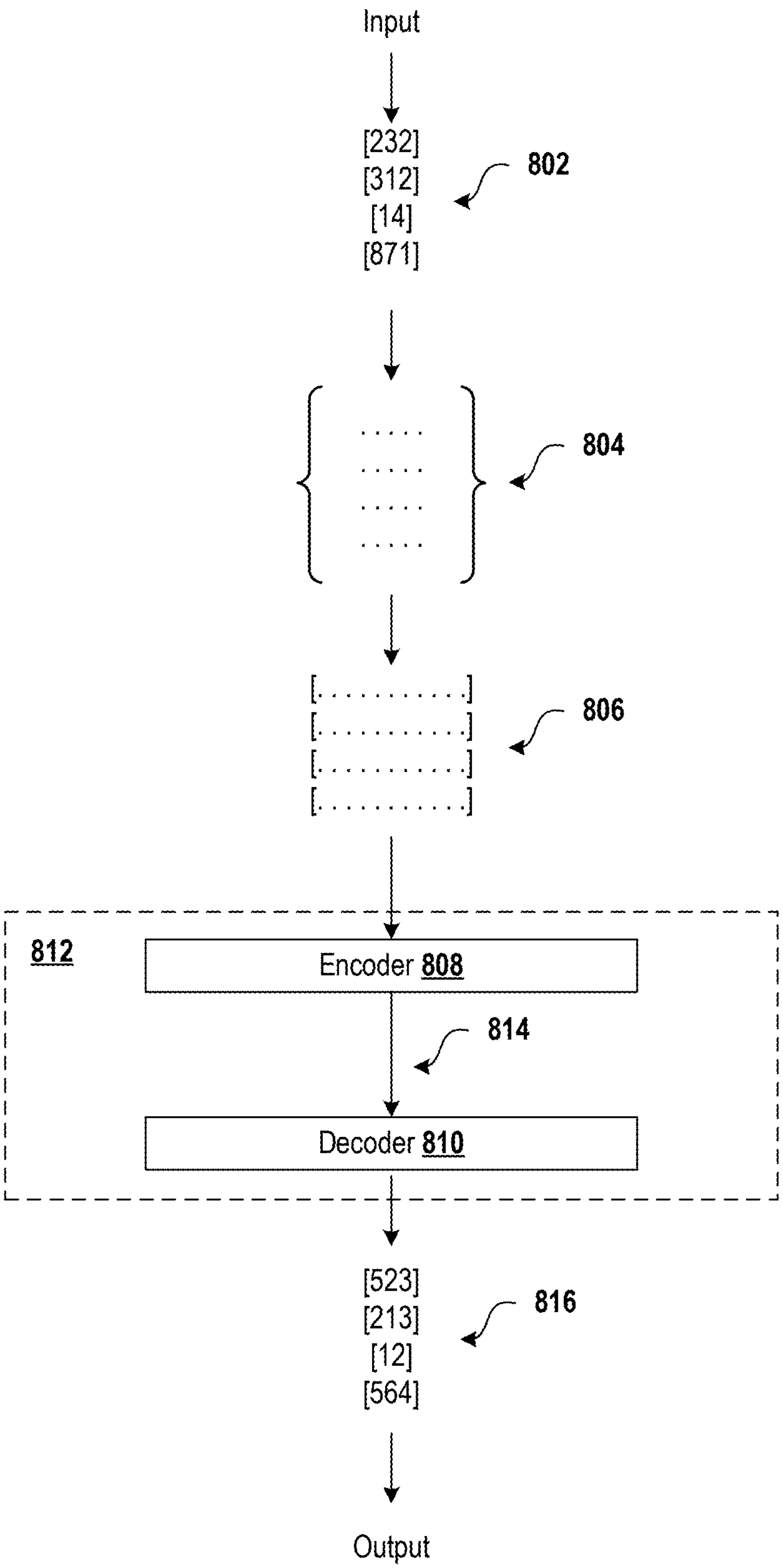
FIG. 8 is a block diagram of an example transformer that may be used for detecting malicious inputs into artificial intelligence agents, in accordance with one or more embodiments of this disclosure.

FIG. 8 is a block diagram of an example transformer 812. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

Transformer 812 may include an encoder 808 (which may include one or more encoder layers/blocks connected in series) and a decoder 810 (which may include one or more decoder layers/blocks connected in series). Generally, encoder 808 and decoder 810 may each include multiple neural network layers, at least one of which may be a self-attention layer. The parameters of the neural network layers may be referred to as the parameters of the language model.

Transformer 812 may be trained to perform certain functions on a natural language input. Examples of the functions include summarizing existing content, brainstorming ideas, writing a rough draft, fixing spelling and grammar, and translating content. Summarizing may include extracting key points or themes from an existing content in a high-level summary. As described herein, it may take existing content from publicly available sources (e.g., text, images, etc.) to help in imputing missing values. Brainstorming ideas may include generating a list of ideas based on provided input. For example, the ML model may generate a list of names for a startup or costumes for an upcoming party. Writing a rough draft may include generating writing in a particular style that may be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, transformer 812 is trained to perform certain functions on other input formats than natural language input. For example, the input may include objects, images, audio content, or video content, or a combination thereof. In some examples, this may be used to generate commands for authorizing and completing the transaction, for example.

Transformer 812 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 8 illustrates an example of how transformer 812 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list, a paragraph), an [EOT] token may be another special token that indicates the end of the textual sequence, other tokens can provide formatting information, etc.

In FIG. 8, a short sequence of tokens 802 corresponding to the input text is illustrated as input to transformer 812. Tokenization of the text sequence into tokens 802 may be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted into transformer 812 may be of any length up to a maximum length defined based on the dimensions of transformer 812. Each token 802 in the token sequence is converted into an embedding 806 (also referred to as "embedding vector").

Embedding 806 is a learned numerical representation (such as, for example, a vector) of a token that captures some semantic meaning of the text segment represented by the token 802. Embedding 806 represents the text segment corresponding to token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, embedding 806 corresponding to the "write" token will be closer to another embedding corresponding to the "jot down" token in the vector space as compared to the distance between the embedding 806 corresponding to the "write" token and another embedding corresponding to the "summary" token.

The vector space may be defined by the dimensions and values of the embedding vectors. Various techniques may be used to convert token 802 into embedding 806. For example, another trained ML model may be used to convert token 802 into embedding 806. In particular, another trained ML model may be used to convert token 802 into embedding 806 in a way that encodes additional information into embedding 806 (e.g., a trained ML model may encode positional information about the position of token 802 in the text sequence into the embedding 806). In some implementations, the numerical value of token 802 may be used to look up the corresponding embedding in an embedding matrix 804, which may be learned during training of transformer 812.

The generated embeddings, e.g., such as embedding 806, are input into the encoder 808. Encoder 808 serves to encode embedding 806 into feature vectors 814 that represent the latent features of embedding 806. Encoder 808 can encode positional information (i.e., information about the sequence of the input) in feature vectors 814. Feature vectors 814 may have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that may be generated by encoder 808 may be referred to as a latent space or feature space.

Conceptually, decoder 810 is designed to map the features represented by feature vectors 814 into meaningful output, which may depend on the task that was assigned to transformer 812. For example, if transformer 812 is used for a translation task, decoder 810 may map feature vectors 814 into text output in a target language different from the language of the original tokens 802. Generally, in a generative language model, decoder 810 serves to decode feature vectors 814 into a sequence of tokens. Decoder 810 may generate output tokens 816 one by one. Each output token 816 may be fed back as input to decoder 810 in order to generate the next output token 816. By feeding back the generated output and applying self-attention, decoder 810 may generate a sequence of output tokens 816 that has sequential meaning (e.g., the resulting output text sequence is understandable as a sentence and obeys grammatical rules). Decoder 810 may generate output tokens 816 until a special [EOT] token (indicating the end of the text) is generated. The resulting sequence of output tokens 816 can then be converted to a text sequence in post-processing. For example, each output token 816 may be an integer number that corresponds to a vocabulary index. By looking up the text segment using the vocabulary index, the text segment corresponding to each output token 816 may be retrieved, the text segments may be concatenated together, and the final output text sequence can be obtained.

In some implementations, the input provided to transformer 812 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes).

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an API). Additionally or alternatively, such a remote language model may be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt may optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 9:
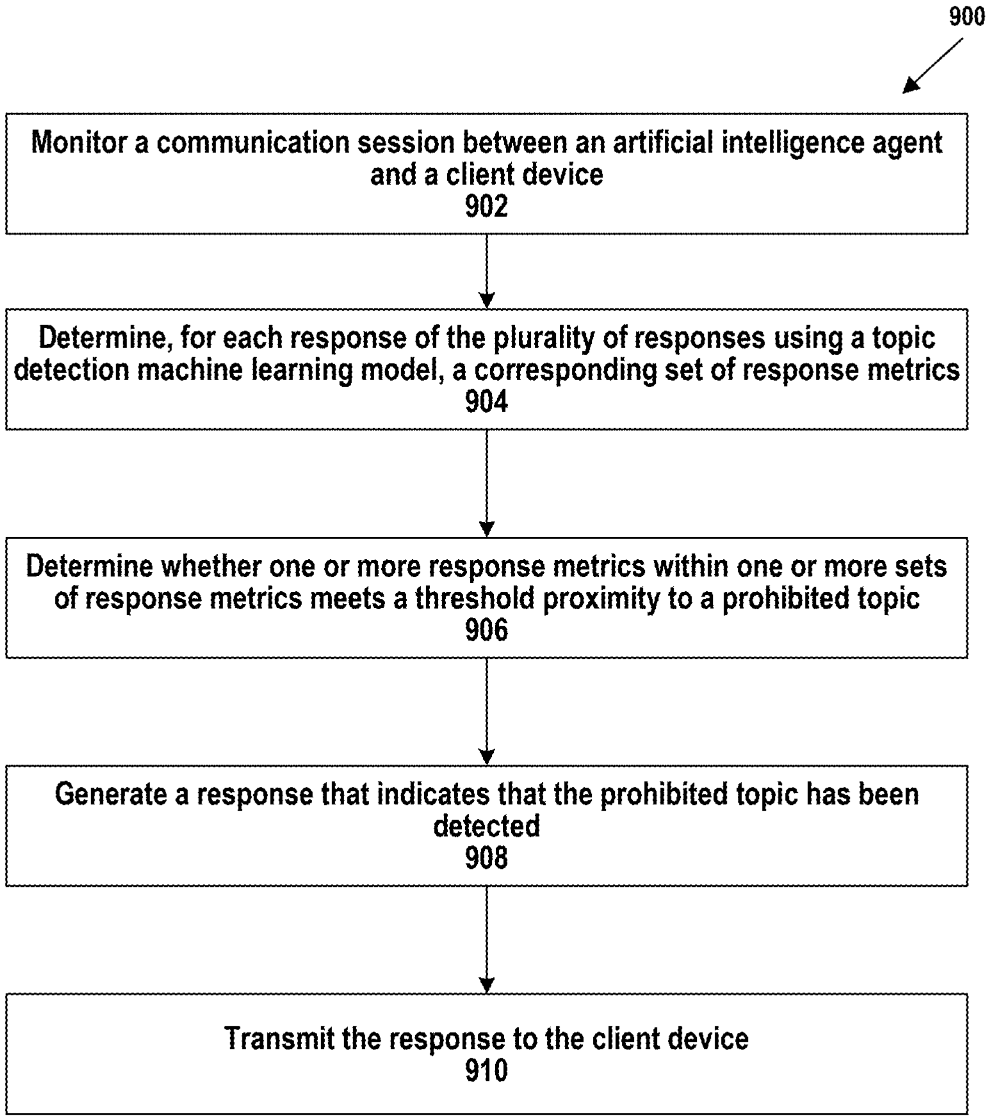
FIG. 9 is a flowchart of operations for detecting malicious inputs into artificial intelligence agents, in accordance with one or more embodiments of this disclosure.

FIG. 9 illustrates process 900 for detecting malicious inputs into artificial intelligence agents through a systematic sequence of monitoring and analysis operations. The process begins at 902, where attack detection system 160 monitors a communication session between an artificial intelligence agent and a client device. This monitoring operation utilizes communication subsystem 162 shown in FIG. 1, which manages data flow between client devices 130, 150, and 170 and the attack detection system 160 through network 140. The monitoring process may be facilitated by processors 610*a*-610*n* depicted in FIG. 6, which execute program instructions 670 stored in system memory 620 to capture and log communication exchanges. Network interface 640 from FIG. 6 may handle the actual data transmission and reception activities required for session monitoring.

At 904, attack detection system 160 determines, for each response of the plurality of responses using a topic detection machine learning model, a corresponding set of response metrics. This analysis operation is performed by topic detection subsystem 164 shown in FIG. 1, which may process response content through specialized machine learning algorithms. The topic detection machine learning model may be implemented using the transformer architecture illustrated in FIG. 8, where response text is tokenized into tokens 802, converted to embeddings 806 through embedding matrix 804, and processed by encoder 808 to generate feature vectors 814. The machine learning model 702 framework shown in FIG. 7 may provide the underlying computational structure for processing input 704 (response content) and generating output 706 (proximity metrics). Computing system 600 components from FIG. 6, including processors 610*a*-610*n* and system memory 620, may execute the computational operations required for the topic detection analysis.

The process continues to 906, where attack detection system 160 determines whether one or more response metrics within one or more sets of response metrics meets a threshold proximity to a prohibited topic. This evaluation operation may utilize the decision-making capabilities of processors 610*a*-610*n* from FIG. 6, which compare calculated proximity values against predetermined threshold levels stored in system memory 620. The threshold comparison process may involve the machine learning model 702 architecture from FIG. 7, where proximity measurements serve as input 704 for threshold evaluation algorithms that generate output 706 indicating whether intervention thresholds have been exceeded.

At 908, based on determining that proximity thresholds have been met, attack detection system 160 generates a response that indicates that the prohibited topic has been detected. This response generation operation may be coordinated by action subsystem 166 shown in FIG. 1, which formulates appropriate security notifications based on the nature of detected threats. The response generation process may utilize the decoder 810 component of transformer 812 illustrated in FIG. 8, which converts feature vectors 814 into output tokens 816 that form structured warning messages. Computing system 600 components from FIG. 6, including processors 610*a*-610*n* executing program instructions 670, may handle the text generation and message formatting operations required for response creation.

Finally, at 910, attack generation system 160 transmits the response to the client device. This transmission operation is facilitated by communication subsystem 162 from FIG. 1, which manages secure delivery of security notifications to client devices 130, 150, or 170 through network 140. Network interface 640 depicted in FIG. 6 may handle the actual data transmission protocols and delivery confirmation mechanisms. The transmission process may utilize I/O interface 650 and I/O device interface 630 from FIG. 6 to coordinate message delivery across various communication channels and ensure reliable notification delivery to the appropriate client device.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

A number of implementations have been described. Nevertheless, it will be understood that various modifications may be made without departing from the spirit and scope of the disclosure. Accordingly, other implementations are within the scope of the following claims.

1. A method comprising: monitoring a communication session between an artificial intelligence agent and a client device, wherein the communication session comprises a plurality of requests from the client device and a plurality of responses from the artificial intelligence agent, and wherein the artificial intelligence agent is associated with a corresponding computer-executable operation set configured to be autonomously executed by the artificial intelligence agent on a software application set; determining, for each response of the plurality of responses using a topic detection machine learning model, a corresponding set of response metrics, wherein each response metric in each corresponding set of response metrics indicates a proximity of a corresponding response to a corresponding prohibited topic, and wherein the topic detection machine learning model has been trained to detect prohibited topics in model inputs; determining whether one or more response metrics within one or more sets of response metrics meets a threshold proximity to a prohibited topic, wherein the threshold proximity indicates that a response metric is within a zone of proximity of the prohibited topic that requires intervention; based on determining that the one or more response metrics within the one or more sets of response metrics meets the threshold proximity, generating a response that indicates that the prohibited topic has been detected; and transmitting the response to the client device.

2. The method of claim 1, further comprising: determining, for the plurality of requests using a proximity detection machine learning model, a plurality of sets of request metrics, wherein each request metric in each set of request metrics indicates the proximity of a corresponding request to one or more prohibited topics, and wherein the proximity detection machine learning model has been trained to detect request proximity to the prohibited topics in the model inputs; determining, based on each corresponding set of request metrics for the communication session, a drift metric indicating a request drift toward the one or more prohibited topics; based on determining that the drift metric meets a drift threshold, determining a plurality of communication session parameters; determining, based on the plurality of communication session parameters and the drift metric, that the communication session is malicious; and based on determining that the communication session is malicious, ending the communication session.
3. The method of any of claims 1-2, wherein the determining the plurality of communication session parameters further comprises: generating a concealment parameter that indicates whether the client device is using a virtual private network server for transmitting requests, wherein use of the virtual private network server indicates concealment; determining a request cadence associated with the communication session, wherein the request cadence indicates a frequency of requests in relation to previous responses; and adding the concealment parameter and the request cadence to the plurality of communication session parameters.
4. The method of any of claims 1-3, further comprising: generating, based on the plurality of communication session parameters, an attack profile, wherein the attack profile comprises the concealment parameter and an indication of the request cadence; comparing the attack profile to known attack profiles to determine whether the attack profile matches previous attack profiles; and based on determining that the attack profile matches a previous attack profile, ending the communication session and storing the attack profile in a database.
5. The method of any of claims 1-4, wherein the comparing the attack profile to the known attack profiles further comprises: inputting the attack profile and the known attack profiles into a similarity machine learning model to obtain a plurality of similarity metrics between the attack profile and each known attack profile, wherein the similarity machine learning model has been trained, using a training dataset, to determine a degree of similarity of a given attack profile and a given known attack profile; determining, whether a similarity metric of the plurality of similarity metrics meets a similarity threshold; and based on determining that the similarity metric of the plurality of similarity metrics meets the similarity threshold, indicating that the attack profile matches a known attack profile.
6. The method of any of claims 1-5, wherein the determining the plurality of communication session parameters further comprises: determining, for the communication session, a location of the client device, a cadence of the plurality of requests from the client device, and linguistic features and patterns within the plurality of requests; and generating, based on the location of the client device, the cadence of the plurality of requests from the client device, and the linguistic features and patterns within the plurality of requests, a demographic profile for the communication session.
7. The method of any of claims 1-6, further comprising: comparing the demographic profile to a known demographic profile associated with a user of the client device to determine whether the demographic profile matches the known demographic profile; and based on determining that the demographic profile does not match the known demographic profile, transmitting an indication that the demographic profile does not match the known demographic profile.
8. The method of any of claims 1-7, wherein the determining the corresponding set of response metrics further comprises: inputting a first response of the plurality of responses into an adversarial artificial intelligence agent to obtain a set of response metrics, wherein the adversarial artificial intelligence agent comprises a machine learning model that has been trained, using a demographic profile for a demographic group, to determine one or more metrics indicating a level of objectionability associated with the response; and storing the set of response metrics in association with the demographic group.
9. One or more non-transitory, computer-readable media storing instructions that, when executed by a data processing apparatus, cause the data processing apparatus to perform operations comprising those of any of claims 1-8.
10. A system comprising: one or more processors; and memory storing instructions that, when executed by the one or more processors, cause the processors to effectuate operations comprising those of any of claims 1-8.
11. A system comprising means for performing any of claims 1-8.
12. A system comprising cloud-based circuitry for performing any of claims 1-8.

What is claimed is:

1. One or more non-transitory computer-readable media storing instructions thereon for detecting malicious inputs into artificial intelligence agents, wherein the instructions cause one or more processors to:

monitor a communication session between an artificial intelligence agent and a client device, wherein the communication session comprises a plurality of requests from the client device and a plurality of responses from the artificial intelligence agent, and wherein the artificial intelligence agent is associated with a corresponding computer-executable operation set configured to be autonomously executed by the artificial intelligence agent on a software application set;

determine, for each response of the plurality of responses and using a topic detection machine learning model, a corresponding set of identifiers for a set of prohibited topics and a corresponding set of response metrics, wherein each response metric in each corresponding set of response metrics indicates a proximity of a corresponding response of the plurality of responses to a corresponding prohibited topic of the set of prohibited topics, and wherein the topic detection machine learning model has been trained to detect prohibited topics in model inputs;

determine whether the proximity of each corresponding response to each prohibited topic indicates a drift toward a zone of proximity of the corresponding prohibited topic that requires intervention, wherein the drift occurs when the proximity of a response to a first prohibited topic is closer than the proximity of a previous response to the first prohibited topic;

based on determining that the proximity of any corresponding response to a prohibited topic indicates the drift toward the zone of proximity of the prohibited topic, generate an updated response that includes an identifier of the prohibited topic; and transmit the updated response to the client device that identifies the prohibited topic.

2. The one or more non-transitory computer-readable media of claim 1, wherein the instructions further cause the one or more processors to:

determine, for the plurality of requests using a proximity detection machine learning model, a plurality of sets of request metrics, wherein each request metric in each set of request metrics indicates the proximity of a corresponding request to one or more prohibited topics, and wherein the proximity detection machine learning model has been trained to detect request proximity to the prohibited topics in the model inputs;

determine, based on each corresponding set of request metrics for the communication session, a drift metric indicating a request drift toward the one or more prohibited topics;

based on determining that the drift metric meets a drift threshold, determine a plurality of communication session parameters;

determine, based on the plurality of communication session parameters and the drift metric, that the communication session is malicious; and based on determining that the communication session is malicious, end the communication session.

3. The one or more non-transitory computer-readable media of claim 2, wherein the instructions for determining the plurality of communication session parameters further cause the one or more processors to:

generate a concealment parameter that indicates whether the client device is using a virtual private network server for transmitting requests, wherein use of the virtual private network server indicates concealment;

determine a request cadence associated with the communication session, wherein the request cadence indicates a frequency of requests in relation to previous responses; and add the concealment parameter and the request cadence to the plurality of communication session parameters.

4. The one or more non-transitory computer-readable media of claim 3, wherein the instructions further cause the one or more processors to:

generate, based on the plurality of communication session parameters, an attack profile, wherein the attack profile comprises the concealment parameter and an indication of the request cadence;

compare the attack profile to known attack profiles to determine whether the attack profile matches previous attack profiles; and based on determining that the attack profile matches a previous attack profile, end the communication session and storing the attack profile in a database.

5. The one or more non-transitory computer-readable media of claim 4, wherein the instructions for comparing the attack profile to the known attack profiles further cause the one or more processors to:

input the attack profile and the known attack profiles into a similarity machine learning model to obtain a plurality of similarity metrics between the attack profile and each known attack profile, wherein the similarity machine learning model has been trained, using a training dataset, to determine a degree of similarity of a given attack profile and a given known attack profile;

determine, whether a similarity metric of the plurality of similarity metrics meets a similarity threshold; and based on determining that the similarity metric of the plurality of similarity metrics meets the similarity threshold, indicate that the attack profile matches a known attack profile.

6. The one or more non-transitory computer-readable media of claim 2, wherein the instructions for determining the plurality of communication session parameters further cause the one or more processors to:

determine, for the communication session, a location of the client device, a cadence of the plurality of requests from the client device, and linguistic features and patterns within the plurality of requests; and generate, based on the location of the client device, the cadence of the plurality of requests from the client device, and the linguistic features and patterns within the plurality of requests, a demographic profile for the communication session.

7. The one or more non-transitory computer-readable media of claim 6, wherein the instructions further cause the one or more processors to:

compare the demographic profile to a known demographic profile associated with a user of the client device to determine whether the demographic profile matches the known demographic profile; and based on determining that the demographic profile does not match the known demographic profile, transmit an indication that the demographic profile does not match the known demographic profile.

8. The one or more non-transitory computer-readable media of claim 1, wherein the instructions for determining the corresponding set of response metrics further cause the one or more processors to:

input a first response of the plurality of responses into an adversarial artificial intelligence agent to obtain a set of response metrics, wherein the adversarial artificial intelligence agent comprises a machine learning model that has been trained, using a demographic profile for a demographic group, to determine one or more metrics indicating a level of objectionability associated with the response; and store the set of response metrics in association with the demographic group.

9. A method for detecting malicious inputs into artificial intelligence agents, the method comprising:

monitoring a communication session between an artificial intelligence agent and a client device, wherein the communication session comprises a plurality of requests from the client device and a plurality of responses from the artificial intelligence agent, and wherein the artificial intelligence agent is associated with a corresponding computer-executable operation set configured to be autonomously executed by the artificial intelligence agent on a software application set;

determining, for each response of the plurality of responses and using a topic detection machine learning model, a corresponding set of identifiers for a set of prohibited topics and a corresponding set of response metrics, wherein each response metric in each corresponding set of response metrics indicates a proximity of a corresponding response of the plurality of responses to a corresponding prohibited topic of the set of prohibited topics, and wherein the topic detection machine learning model has been trained to detect prohibited topics in model inputs;

determining whether the proximity of each corresponding response to each prohibited topic indicates a drift toward a zone of proximity of the corresponding prohibited topic that requires intervention, wherein the drift occurs when the proximity of a response to a first prohibited topic is closer than the proximity of a previous response to the first prohibited topic;

based on determining that the proximity of any corresponding response to a prohibited topic indicates the drift toward the zone of proximity of the prohibited topic, generating an updated response that includes an identifier of the prohibited topic; and transmitting the updated response to the client device that identifies the prohibited topic.

10. The method of claim 9, further comprising:

determining, for the plurality of requests using a proximity detection machine learning model, a plurality of sets of request metrics, wherein each request metric in each set of request metrics indicates the proximity of a corresponding request to one or more prohibited topics, and wherein the proximity detection machine learning model has been trained to detect request proximity to the prohibited topics in the model inputs;

determining, based on each corresponding set of request metrics for the communication session, a drift metric indicating a request drift toward the one or more prohibited topics;

based on determining that the drift metric meets a drift threshold, determining a plurality of communication session parameters;

determining, based on the plurality of communication session parameters and the drift metric, that the communication session is malicious; and based on determining that the communication session is malicious, ending the communication session.

11. The method of claim 10, wherein determining the plurality of communication session parameters further comprises:

generating a concealment parameter that indicates whether the client device is using a virtual private network server for transmitting requests, wherein use of the virtual private network server indicates concealment;

determining a request cadence associated with the communication session, wherein the request cadence indicates a frequency of requests in relation to previous responses; and adding the concealment parameter and the request cadence to the plurality of communication session parameters.

12. The method of claim 11, further comprising:

generating, based on the plurality of communication session parameters, an attack profile, wherein the attack profile comprises the concealment parameter and an indication of the request cadence;

comparing the attack profile to known attack profiles to determine whether the attack profile matches previous attack profiles; and based on determining that the attack profile matches a previous attack profile, ending the communication session and storing the attack profile in a database.

13. The method of claim 12, wherein comparing the attack profile to the known attack profiles further comprises:

inputting the attack profile and the known attack profiles into a similarity machine learning model to obtain a plurality of similarity metrics between the attack profile and each known attack profile, wherein the similarity machine learning model has been trained, using a training dataset, to determine a degree of similarity of a given attack profile and a given known attack profile;

determining, whether a similarity metric of the plurality of similarity metrics meets a similarity threshold; and based on determining that the similarity metric of the plurality of similarity metrics meets the similarity threshold, indicating that the attack profile matches a known attack profile.

14. The method of claim 10, wherein determining the plurality of communication session parameters further comprises:

determining, for the communication session, a location of the client device, a cadence of the plurality of requests from the client device, and linguistic features and patterns within the plurality of requests; and generating, based on the location of the client device, the cadence of the plurality of requests from the client device, and the linguistic features and patterns within the plurality of requests, a demographic profile for the communication session.

15. The method of claim 14, further comprising:

comparing the demographic profile to a known demographic profile associated with a user of the client device to determine whether the demographic profile matches the known demographic profile; and based on determining that the demographic profile does not match the known demographic profile, transmitting an indication that the demographic profile does not match the known demographic profile.

16. The method of claim 9, wherein determining the corresponding set of response metrics further comprises:

inputting a first response of the plurality of responses into an adversarial artificial intelligence agent to obtain a set of response metrics, wherein the adversarial artificial intelligence agent comprises a machine learning model that has been trained, using a demographic profile for a demographic group, to determine one or more metrics indicating a level of objectionability associated with the response; and storing the set of response metrics in association with the demographic group.

17. A system comprising:

one or more memories storing instructions; and one or more processors, wherein the instructions cause the one or more processors to:

monitor a communication session between an artificial intelligence agent and a client device, wherein the communication session comprises a plurality of requests from the client device and a plurality of responses from the artificial intelligence agent, and wherein the artificial intelligence agent is associated with a corresponding computer-executable operation set configured to be autonomously executed by the artificial intelligence agent on a software application set;

determine, for each response of the plurality of responses and using a topic detection machine learning model, a corresponding set of identifiers for a set of prohibited topics and a corresponding set of response metrics, wherein each response metric in each corresponding set of response metrics indicates a proximity of a corresponding response of the plurality of responses to a corresponding prohibited topic of the set of prohibited topics, and wherein the topic detection machine learning model has been trained to detect prohibited topics in model inputs;

determine whether the proximity of each corresponding response to each prohibited topic indicates a drift toward a zone of proximity of the corresponding prohibited topic that requires intervention, wherein the drift occurs when the proximity of a response to a first prohibited topic is closer than the proximity of a previous response to the first prohibited topic;

based on determining that the proximity of any corresponding response to a prohibited topic indicates the drift toward the zone of proximity of the prohibited topic, generate an updated response that includes an identifier of the prohibited topic; and transmit the updated response that identifies the prohibited topic.

18. The system of claim 17, wherein the instructions further cause the one or more processors to:

determine, for the plurality of requests using a proximity detection machine learning model, a plurality of sets of request metrics, wherein each request metric in each set of request metrics indicates the proximity of a corresponding request to one or more prohibited topics, and wherein the proximity detection machine learning model has been trained to detect request proximity to the prohibited topics in the model inputs;

determine, based on each corresponding set of request metrics for the communication session, a drift metric indicating a request drift toward the one or more prohibited topics;

based on determining that the drift metric meets a drift threshold, determine a plurality of communication session parameters;

determine, based on the plurality of communication session parameters and the drift metric, that the communication session is malicious; and based on determining that the communication session is malicious, end the communication session.

19. The system of claim 18, wherein the instructions for determining the plurality of communication session parameters further cause the one or more processors to:

generate a concealment parameter that indicates whether the client device is using a virtual private network server for transmitting requests, wherein use of the virtual private network server indicates concealment;

determine a request cadence associated with the communication session, wherein the request cadence indicates a frequency of requests in relation to previous responses; and add the concealment parameter and the request cadence to the plurality of communication session parameters.

20. The system of claim 17, wherein a first monitoring artificial intelligence agent perform specific input monitoring of the artificial intelligence agent to prevent malicious requests and malicious responses in relation to the artificial intelligence agent, a second monitoring artificial intelligence agent performs drift analysis of requests and responses to prevent malicious sessions where each particular request does not trigger the first monitoring artificial intelligence agent.

* * * * *